US012451602B2

(12) United States Patent
Pu et al.

(10) Patent No.: US 12,451,602 B2
(45) Date of Patent: Oct. 21, 2025

(54) ANTENNA SYSTEM

(71) Applicant: HUAWEI TECHNOLOGIES CO., LTD., Guangdong (CN)

(72) Inventors: Tao Pu, Shanghai (CN); Jia Lv, Shanghai (CN); Jianping Li, Dongguan (CN); Runxiao Zhang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 196 days.

(21) Appl. No.: 18/319,426

(22) Filed: May 17, 2023

(65) Prior Publication Data

US 2023/0291099 A1 Sep. 14, 2023

Related U.S. Application Data

(63) Continuation of application No. PCT/CN2021/132065, filed on Nov. 22, 2021.

(30) Foreign Application Priority Data

Nov. 24, 2020 (CN) ........................ 202011328945.8

(51) Int. Cl.
*H01Q 3/34* (2006.01)
*H01Q 1/12* (2006.01)
(Continued)

(52) U.S. Cl.
CPC ............ *H01Q 3/34* (2013.01); *H01Q 1/1228* (2013.01); *H01Q 3/02* (2013.01); *H01Q 21/10* (2013.01)

(58) Field of Classification Search
CPC ...... H01Q 1/246; H01Q 21/0025; H01Q 1/50; H01Q 3/26; H01Q 3/32; H01Q 21/22;
(Continued)

(56) References Cited

U.S. PATENT DOCUMENTS

2004/0038714 A1* 2/2004 Rhodes .................... H01Q 3/32 455/562.1
2007/0030208 A1 2/2007 Linehan
(Continued)

FOREIGN PATENT DOCUMENTS

CN 102273013 A 12/2011
CN 104508903 A 4/2015
(Continued)

*Primary Examiner* — Hai V Tran

(57) ABSTRACT

This disclosure provides an antenna system to improve communication flexibility. The antenna system includes a radio frequency unit, a divider, a first modulator, a second modulator, a first antenna and a second antenna. The radio frequency unit is configured to generate a first radio frequency signal. The divider is configured to divide the first radio frequency signal into first and second radio frequency sub-signals. The first modulator is configured to adjust a first electrical downtilt of the first radio frequency sub-signal and send the adjusted first radio frequency sub-signal to the first antenna for transmission. The second modulator is configured to adjust a second electrical downtilt of the second radio frequency sub-signal and send the adjusted second readio frequency sub-signal to the second antenna for transmission. The adjustion is based on a target downtilt of the first radio frequency signal and a mechanical downtilt of the first or second antenna.

20 Claims, 12 Drawing Sheets

(51) Int. Cl.

| | |
|---|---|
| ***H01Q 3/02*** | (2006.01) |
| ***H01Q 21/10*** | (2006.01) |

(58) Field of Classification Search

CPC .......... H01Q 3/24; H01Q 3/36; H01Q 21/061; H01Q 3/34; H01Q 3/02; H01Q 1/1228; H01Q 21/10; H04W 88/08; H01P 1/18; H01P 5/04

See application file for complete search history.

(56) References Cited

U.S. PATENT DOCUMENTS

| | | | | |
|---|---|---|---|---|
| 2009/0289864 | A1* | 11/2009 | Derneryd .......... | H01Q 21/0018 343/893 |
| 2014/0213322 | A1* | 7/2014 | Pu .......................... | H01Q 1/246 455/562.1 |
| 2019/0273542 | A1 | 9/2019 | Dong et al. | |

FOREIGN PATENT DOCUMENTS

| | | | |
|---|---|---|---|
| CN | 208507961 | U | 2/2019 |
| CN | 109755718 | A | 5/2019 |
| CN | 208970737 | U | 6/2019 |
| CN | 110970731 | A | 4/2020 |
| EP | 1362387 | B1 | 3/2009 |
| JP | 2008011104 | A | 1/2008 |
| JP | 2008523708 | A | 7/2008 |
| JP | 2012054793 | A | 3/2012 |

* cited by examiner

ANTENNA SYSTEM

CROSS-REFERENCE TO RELATED APPLICATIONS

This application is a continuation of International Application No. PCT/CN2021/132065, filed on Nov. 22, 2021, which claims priority to Chinese Patent Application No. 202011328945.8, filed on Nov. 24, 2020. The disclosures of the aforementioned applications are hereby incorporated by reference in their entireties.

TECHNICAL FIELD

Embodiments of this application relate to the communication field, and more specifically, to an antenna system.

BACKGROUND

With development of communication technologies, there are more telecom carriers, and antenna panels become scarce resources.

In a possible solution, two or more antennas may be integrated on a same panel, where different antennas may be used in processes of receiving and sending different signals, so that a panel resource can be saved.

However, in this arrangement, downtilts of the antennas integrated on the same antenna panel need to be consistent. As a result, signal coverage of the antennas on the same antenna panel cannot be individually adjusted, and communication flexibility is severely affected.

Therefore, it is desirable to provide a technology to improve communication flexibility on the premise of saving antenna panel resources.

SUMMARY

This disclosure provides an antenna system, to improve communication flexibility on the premise of saving antenna panel resources.

According to a first aspect, an antenna system is provided, including a first antenna, a second antenna, a radio frequency unit, a first modulator, a second modulator, and a divider. The first antenna is capable of rotating around a first rotation axis to adjust a first mechanical downtilt of the first antenna, and the second antenna is capable of rotating around a second rotation axis to adjust a second mechanical downtilt of the second antenna. The radio frequency unit is configured to generate a to-be-sent first radio frequency signal. The divider is configured to divide the first radio frequency signal into a first radio frequency sub-signal and a second radio frequency sub-signal. The first modulator is configured to perform first processing on the first radio frequency sub-signal, to adjust a first electrical downtilt of the first radio frequency sub-signal, where the first electrical downtilt is determined based on a target downtilt corresponding to the first radio frequency signal and the first mechanical downtilt. The second modulator is configured to perform second processing on the second radio frequency sub-signal, to adjust a second electrical downtilt of the second radio frequency subsignal, where the second electrical downtilt is determined based on the target downtilt corresponding to the first radio frequency signal and the second mechanical downtilt. The first antenna is configured to transmit a first radio frequency sub-signal on which the first processing is performed. The first antenna is configured to transmit a second radio frequency sub-signal on which the second processing is performed.

According to the solution provided in this application, two antennas for sending a same signal are separately configured (where specifically, mechanical downtilts of the antennas can be separately configured through adjustment), and a modulator for adjusting an electrical downtilt of each antenna is separately disposed for each antenna. Therefore, even if at least one of the first antenna and the second antenna shares a same antenna panel with another antenna, coverage of the signal sent by using the two antennas can be adjusted by adjusting the electrical downtilt, so that communication flexibility can be improved on the premise of saving antenna panel resources.

As an example instead of a limitation, the antenna system further includes a first sensor configured to detect the first mechanical downtilt and a second sensor configured to detect the second mechanical downtilt.

In an implementation, the antenna system further includes a third antenna, disposed on the first antenna.

In another implementation, the antenna system further includes a fourth antenna, disposed on the second antenna.

For example, the third antenna is an active antenna, and the fourth antenna is an active antenna.

In addition, the first antenna is a passive antenna, and the second antenna is a passive antenna.

For another example, the third antenna is a passive antenna, and the fourth antenna is a passive antenna.

In addition, the first antenna is an active antenna, and the second antenna is an active antenna.

In this application, the first rotation axis and the second rotation axis are disposed in parallel.

In addition, the first rotation axis may be disposed at any location such as an edge or a center of the first antenna.

The second rotation axis may be disposed at any location such as an edge or a center of the first antenna. This is not particularly limited in this application.

In this application, the first modulator may be a circuit or a mechanical unit that has a phase modulation function.

In a possible implementation, the first modulator may further adjust an amplitude of the first radio frequency sub-signal.

As an example instead of a limitation, the first modulator includes a divider and a phase shifter.

To be specific, the first radio frequency sub-signal may be divided into two signals by using the divider, and a phase difference between the two signals is adjusted by using the phase shifter, to adjust the first electrical downtilt.

Similarly, in this application, the second modulator may be a circuit or a mechanical unit that has a phase modulation function.

In a possible implementation, the second modulator may further adjust an amplitude of the second radio frequency sub-signal.

For example, the second modulator includes a divider and a phase shifter.

To be specific, the second radio frequency sub-signal may be divided into two signals by using the divider, and a phase difference between the two signals is adjusted by using the phase shifter, to adjust the second electrical downtilt.

In an implementation, the antenna system further includes a first controller and a second controller. The first controller is configured to control, based on the target downtilt corresponding to the first radio frequency signal and the first mechanical downtilt, the first modulator to perform the first processing. The second controller is configured to control, based on the target downtilt corresponding to the first radio frequency signal and the second mechanical downtilt, the second modulator to perform the second processing.

In another implementation, the first controller may be disposed or integrated into the first modulator, or the second controller may be disposed or integrated into the second modulator.

In a possible implementation, the antenna system further includes the first sensor, communicatively connected to the first controller, and configured to detect the first mechanical downtilt and send indication information of the first mechanical downtilt to the first controller.

In another possible implementation, the antenna system further includes the second sensor, communicatively connected to the second controller, and configured to detect the second mechanical downtilt and send indication information of the second mechanical downtilt to the second controller.

As an example instead of a limitation, when both the first mechanical downtilt and the second mechanical downtilt are 0, the first antenna and the second antenna are coplanar.

Alternatively, when both the first mechanical downtilt and the second mechanical downtilt are 0, the first antenna and the second antenna are non-coplanar.

As an example instead of a limitation, the antenna system further includes a third modulator. The third modulator is configured to perform third processing on a target radio frequency sub-signal, to adjust a phase difference between the first radio frequency sub-signal and the second radio frequency sub-signal. The target radio frequency sub-signal is at least one of the first radio frequency sub-signal and the second radio frequency sub-signal.

Therefore, a time interval between sending moments of the first radio frequency sub-signal and the second radio frequency sub-signal can be adjusted by adjusting the phase difference between the first radio frequency sub-signal and the second radio frequency sub-signal, to compensate for a deviation that is between transmission duration of the first radio frequency sub-signal and the second radio frequency sub-signal from being sent from the antenna to reaching a receiving end and that is caused by the different downtilts of the first antenna and the second antenna, so that the receiving end can synchronously receive the first radio frequency sub-signal and the second radio frequency sub-signal, and accuracy and reliability of communication are improved.

In an implementation, the phase difference P is determined based on first information, and the first information includes at least one of the following: a wavelength $\lambda$ of the first radio frequency signal, the first mechanical downtilt $\varphi 1$, the second mechanical downtilt $\varphi 2$, the first electrical downtilt $\theta 1$, or the second electrical downtilt $\theta 2$.

For example, when the first antenna and the second antenna are arranged up and down in a gravity direction, the target radio frequency sub-signal is one of the first radio frequency sub-signal and the second radio frequency sub-signal that is sent by using a target antenna. The target antenna is the lower one of the first antenna and the second antenna in the gravity direction.

In this case, the first information further includes a length M of the target antenna and a distance L between the first antenna and the second antenna in the gravity direction when both the first mechanical downtilt and the second mechanical downtilt are 0.

As an example instead of a limitation, the phase difference P is determined based on the following formula:

$$P=2\pi*(L*\sin(\varphi 1+\theta 1)+M*\sin(\varphi 2+\theta 2)/\lambda).$$

In another implementation, if the first antenna and the second antenna are non-coplanar when both the first mechanical downtilt and the second mechanical downtilt are 0, the first information further includes a distance N between the first antenna and the second antenna in a horizontal direction when both the first mechanical downtilt and the second mechanical downtilt are 0.

It should be understood that the foregoing describes the antenna system in the first aspect and the possible implementations of the first aspect by using functions of the components when a signal is sent as an example. However, this application is not limited thereto. The antenna system in the first aspect and the possible implementations of the first aspect is also applicable to a signal receiving process. For example, a signal received by the first antenna is denoted as a signal 1, and a signal received by the second antenna is denoted as a signal 2, where the signal 1 and the signal 2 have a same wavelength and carry same data. The first modulator is configured to process the signal 1 (corresponding to the foregoing first processing, for example, phase shifting processing), and the second modulator is configured to process the signal 2 (corresponding to the foregoing second processing, for example, phase shifting processing). In addition, the divider may implement a function of a combiner in the signal receiving process. To be specific, the divider is configured to combine a signal 1 and a signal 2 that are processed by the modulators, and send a combined signal to the radio frequency unit. It should be noted that the foregoing signal receiving process is merely an example for description, and is not particularly limited in this application. The signal receiving process is an inverse process of a signal sending process. To avoid repetition, detailed descriptions thereof are omitted.

According to a second aspect, an antenna system is provided, including a first antenna, a second antenna, a radio frequency unit, a first modulator, and a second modulator. The first antenna is capable of rotating around a first rotation axis to adjust a first mechanical downtilt of the first antenna, and the second antenna is capable of rotating around a second rotation axis to adjust a second mechanical downtilt of the second antenna. The radio frequency unit is configured to generate a first radio frequency signal and a second radio frequency signal that are to be sent, where the first radio frequency signal and the second radio frequency signal have a same wavelength, the first radio frequency signal and the second radio frequency signal carry same data, and the first radio frequency signal and the second radio frequency signal have a same target downtilt. The first modulator is configured to perform first processing on the first radio frequency signal, to adjust a first electrical downtilt of the first radio frequency signal, where the first electrical downtilt is determined based on the target downtilt and the first mechanical downtilt. The second modulator is configured to perform second processing on the second radio frequency signal, to adjust a second electrical downtilt of the second radio frequency sub-signal, where the second electrical downtilt is determined based on the target downtilt and the second mechanical downtilt. The first antenna is configured to transmit a first radio frequency sub-signal on which the first processing is performed. The first antenna is configured to transmit a second radio frequency sub-signal on which the second processing is performed.

According to the solution provided in this application, two antennas that are configured to send signals that have a same wavelength and carry same data are separately configured (where specifically, mechanical downtilts of the antennas can be separately configured through adjustment), and a modulator for adjusting an electrical downtilt of each antenna is separately disposed for each antenna. Therefore, even if at least one of the first antenna and the second antenna shares a same antenna panel with another antenna, coverage of the signal sent by using the two antennas can be adjusted by adjusting the electrical downtilt, so that communication flexibility can be improved on the premise of saving antenna panel resources.

As an example instead of a limitation, the antenna system further includes a first sensor configured to detect the first mechanical downtilt and a second sensor configured to detect the second mechanical downtilt.

In an implementation, the antenna system further includes a third antenna, disposed on the first antenna.

In another implementation, the antenna system further includes a fourth antenna, disposed on the second antenna.

For example, the third antenna is an active antenna, and the fourth antenna is an active antenna.

In addition, the first antenna is a passive antenna, and the second antenna is a passive antenna.

For another example, the third antenna is a passive antenna, and the fourth antenna is a passive antenna.

In addition, the first antenna is an active antenna, and the second antenna is an active antenna.

In this application, the first rotation axis and the second rotation axis are disposed in parallel.

In addition, the first rotation axis may be disposed at any location such as an edge or a center of the first antenna.

The second rotation axis may be disposed at any location such as an edge or a center of the first antenna. This is not particularly limited in this application.

In this application, the first modulator may be a circuit or a mechanical unit that has a phase modulation function.

In a possible implementation, the first modulator may further adjust an amplitude of the first radio frequency signal.

As an example instead of a limitation, the first modulator includes a divider and a phase shifter.

To be specific, the first radio frequency signal may be divided into two signals by using the divider, and a phase difference between the two signals is adjusted by using the phase shifter, to adjust the first electrical downtilt.

Similarly, the second modulator may be a circuit or a mechanical unit that has a phase modulation function.

In a possible implementation, the second modulator may further adjust an amplitude of the second radio frequency signal.

For example, the second modulator includes a divider and a phase shifter.

To be specific, the second radio frequency signal may be divided into two signals by using the divider, and a phase difference between the two signals is adjusted by using the phase shifter, to adjust the second electrical downtilt.

Optionally, the antenna system further includes a first controller and a second controller. The first controller is configured to control, based on the target downtilt corresponding to the first radio frequency signal and the first mechanical downtilt, the first modulator to perform the first processing. The second controller is configured to control, based on the target downtilt corresponding to the first radio frequency signal and the second mechanical downtilt, the second modulator to perform the second processing.

In another implementation, the first controller may be disposed or integrated into the first modulator, or the second controller may be disposed or integrated into the second modulator.

Optionally, when both the first mechanical downtilt and the second mechanical downtilt are 0, the first antenna and the second antenna are coplanar.

In this application, there is a phase difference P between the first radio frequency signal and the second radio frequency signal that are generated by the radio frequency unit.

Therefore, a time interval between sending moments of the first radio frequency signal and the second radio frequency signal can be adjusted by adjusting the phase difference between the first radio frequency signal and the second radio frequency signal, to compensate for a deviation that is between transmission duration of the first radio frequency signal and the second radio frequency signal from being sent from the antenna to reaching a receiving end and that is caused by the different downtilts of the first antenna and the second antenna, so that the receiving end can synchronously receive the first radio frequency signal and the second radio frequency signal, and accuracy and reliability of communication are improved.

In an implementation, the phase difference P is determined based on first information, and the first information includes at least one of the following: a wavelength λ of the first radio frequency signal, the first mechanical downtilt φ1, the second mechanical downtilt φ2, the first electrical downtilt θ1, or the second electrical downtilt θ2.

In addition, when the first antenna and the second antenna are arranged up and down in a gravity direction, the first information further includes a length M of a target antenna and a distance L between the first antenna and the second antenna in the gravity direction when both the first mechanical downtilt and the second mechanical downtilt are 0. The target antenna is the lower one of the first antenna and the second antenna in the gravity direction.

Optionally, the phase difference P is determined based on the following formula:

$$P=2\pi*(L*\sin(\varphi1+\theta1)+M*\sin(\varphi2+\theta2)/\lambda).$$

In addition, if the first antenna and the second antenna are non-coplanar when both the first mechanical downtilt and the second mechanical downtilt are 0, the first information further includes a distance N between the first antenna and the second antenna in a horizontal direction when both the first mechanical downtilt and the second mechanical downtilt are 0.

It should be understood that the foregoing describes the antenna system in the second aspect and the possible implementations of the second aspect by using functions of the components when a signal is sent as an example. However, this application is not limited thereto. The antenna system in the second aspect and the possible implementations of the second aspect is also applicable to a signal receiving process. For example, a signal received by the first antenna is denoted as a signal 3, and a signal received by the second antenna is denoted as a signal 4, where the signal 3 and the signal 4 have a same wavelength and carry same data. The first modulator is configured to process the signal 3 (corresponding to the foregoing first processing, for example, phase shifting processing), and the second modulator is configured to process the signal 4 (corresponding to the foregoing second processing, for example, phase shifting processing). In addition, the divider may implement a function of a combiner in the signal receiving process. To be specific, the divider is configured to combine a signal 3 and a signal 4 that are processed by the modulators, and send a combined signal to the radio frequency unit. It should be noted that the foregoing signal receiving process is merely an example for description, and is not particularly limited in this application. The signal receiving process is an inverse process of a signal sending process. To avoid repetition, detailed descriptions thereof are omitted.

According to a third aspect, an antenna system is provided, including a first antenna, a second antenna, and a radio frequency unit. The first antenna is capable of rotating around a first rotation axis to adjust a first mechanical downtilt of the first antenna, and the second antenna is capable of rotating around a second rotation axis to adjust a second mechanical downtilt of the second antenna. The radio frequency unit is configured to generate a first radio frequency signal, a second radio frequency signal, a third radio frequency signal, and a fourth radio frequency signal that are to be sent. The first radio frequency signal, the second radio frequency signal, the third radio frequency signal, and the fourth radio frequency signal have a same wavelength, the first radio frequency signal, the second radio frequency signal, the third radio frequency signal, and the fourth radio frequency signal carry same data, and the first radio frequency signal, the second radio frequency signal, the third radio frequency signal, and the fourth radio frequency signal have a same target downtilt. There is a first phase difference between the first radio frequency signal and the second radio frequency signal, and there is a second phase difference between the third radio frequency signal and the fourth radio frequency signal. The first phase difference is determined based on the target downtilt and the first mechanical downtilt, and the second phase difference is determined based on the target downtilt and the second mechanical downtilt. The first antenna is configured to transmit the first radio frequency signal and the second radio frequency signal. The second antenna is configured to transmit the third radio frequency signal and the fourth radio frequency signal.

According to the solution provided in this application, two antennas that are configured to send signals that have a same wavelength and carry same data are separately configured (where specifically, mechanical downtilts of the antennas can be separately configured through adjustment), an electrical downtilt of the first antenna is adjusted by using the phase difference between the first radio frequency signal and the second radio frequency signal, and an electrical downtilt of the second antenna is adjusted by using the phase difference between the third radio frequency signal and the fourth radio frequency signal. Therefore, even if at least one of the first antenna and the second antenna shares a same antenna panel with another antenna, coverage of the signal sent by using the two antennas can be adjusted by adjusting the electrical downtilt, so that communication flexibility can be improved on the premise of saving antenna panel resources.

As an example instead of a limitation, the antenna system further includes a first sensor configured to detect the first mechanical downtilt and a second sensor configured to detect the second mechanical downtilt.

In an implementation, the antenna system further includes a third antenna, disposed on the first antenna.

In another implementation, the antenna system further includes a fourth antenna, disposed on the second antenna.

For example, the third antenna is an active antenna, and the fourth antenna is an active antenna.

In addition, the first antenna is a passive antenna, and the second antenna is a passive antenna.

For another example, the third antenna is a passive antenna, and the fourth antenna is a passive antenna.

In addition, the first antenna is an active antenna, and the second antenna is an active antenna.

In this application, the first rotation axis and the second rotation axis are disposed in parallel.

In addition, the first rotation axis may be disposed at any location such as an edge or a center of the first antenna.

The second rotation axis may be disposed at any location such as an edge or a center of the first antenna. This is not particularly limited in this application.

Optionally, when both the first mechanical downtilt and the second mechanical downtilt are 0, the first antenna and the second antenna are coplanar.

Optionally, there is a third phase difference P between a fifth radio frequency signal and a sixth radio frequency signal. The fifth radio frequency signal is a signal with a lagging phase in the first radio frequency signal and the second radio frequency signal. The sixth radio frequency signal is a signal with a lagging phase in the third radio frequency signal and the fourth radio frequency signal.

Optionally, the third phase difference P is determined based on first information, and the first information includes at least one of the following: a wavelength λ of the first radio frequency signal, the first mechanical downtilt φ1, the second mechanical downtilt φ2, a first electrical downtilt θ1, or a second electrical downtilt θ2.

Optionally, when the first antenna and the second antenna are arranged up and down in a gravity direction, the first information further includes a length M of a target antenna and a distance L between the first antenna and the second antenna in the gravity direction when both the first mechanical downtilt and the second mechanical downtilt are 0. The target antenna is the lower one of the first antenna and the second antenna in the gravity direction.

Optionally, the third phase difference P is determined based on the following formula:

$$P=2\pi*(L*\sin(\varphi1+\theta1)+M*\sin(\varphi2+\theta2)/\lambda).$$

Optionally, if the first antenna and the second antenna are non-coplanar when both the first mechanical downtilt and the second mechanical downtilt are 0, the first information further includes a distance N between the first antenna and the second antenna in a horizontal direction when both the first mechanical downtilt and the second mechanical downtilt are 0.

It should be understood that the foregoing describes the antenna system in the third aspect and the possible implementations of the third aspect by using functions of the components when a signal is sent as an example. However, this application is not limited thereto. The antenna system in the third aspect and the possible implementations of the third aspect is also applicable to a signal receiving process. For example, a signal received by the first antenna is denoted as a signal 3, and a signal received by the second antenna is denoted as a signal 4, where the signal 3 and the signal 4 have a same wavelength and carry same data. The first modulator is configured to process the signal 3 (corresponding to the foregoing first processing, for example, phase shifting processing), and the second modulator is configured to process the signal 4 (corresponding to the foregoing second processing, for example, phase shifting processing). In addition, the divider may implement a function of a combiner in the signal receiving process. To be specific, the divider is configured to combine a signal 3 and a signal 4 that are processed by the modulators, and send a combined signal to the radio frequency unit. It should be noted that the foregoing signal receiving process is merely an example for description, and is not particularly limited in this application. The signal receiving process is an inverse process of a signal sending process. To avoid repetition, detailed descriptions thereof are omitted.

According to a fourth aspect, an antenna system is provided, including a first antenna, a second antenna, a radio frequency unit, a first modulator, a second modulator, and a divider. The first antenna is capable of rotating around a first rotation axis to adjust a first mechanical azimuth of the first antenna, and the second antenna is capable of rotating around a second rotation axis to adjust a second mechanical azimuth of the second antenna. The radio frequency unit is configured to generate a to-be-sent first radio frequency signal. The divider is configured to divide the first radio frequency signal into a first radio frequency sub-signal and a second radio frequency sub-signal. The first modulator is configured to perform first processing on the first radio frequency sub-signal, to adjust a first electrical azimuth of the first radio frequency sub-signal, where the first electrical azimuth is determined based on a target azimuth corresponding to the first radio frequency signal and the first mechanical azimuth. The second modulator is configured to perform second processing on the second radio frequency sub-signal, to adjust a second electrical azimuth of the second radio frequency sub-signal, where the second electrical azimuth is determined based on the target azimuth corresponding to the first radio frequency signal and the second mechanical azimuth. The first antenna is configured to transmit a first radio frequency sub-signal on which the first processing is performed. The first antenna is configured to transmit a second radio frequency sub-signal on which the second processing is performed.

According to the solution provided in this application, two antennas for sending a same signal are separately configured (where specifically, mechanical azimuths of the antennas can be separately configured through adjustment), and a modulator for adjusting an electrical azimuth of each antenna is separately disposed for each antenna. Therefore, even if at least one of the first antenna and the second antenna shares a same antenna panel with another antenna, coverage of the signal sent by using the two antennas can be adjusted by adjusting the electrical azimuth, so that communication flexibility can be improved on the premise of saving antenna panel resources.

As an example instead of a limitation, the antenna system further includes a first sensor configured to detect the first mechanical azimuth and a second sensor configured to detect the second mechanical azimuth.

In an implementation, the antenna system further includes a third antenna, disposed on the first antenna.

In another implementation, the antenna system further includes a fourth antenna, disposed on the second antenna.

For example, the third antenna is an active antenna, and the fourth antenna is an active antenna.

In addition, the first antenna is a passive antenna, and the second antenna is a passive antenna.

For another example, the third antenna is a passive antenna, and the fourth antenna is a passive antenna.

In addition, the first antenna is an active antenna, and the second antenna is an active antenna.

In this application, the first rotation axis and the second rotation axis are disposed in parallel.

In addition, the first rotation axis may be disposed at any location such as an edge or a center of the first antenna.

The second rotation axis may be disposed at any location such as an edge or a center of the first antenna. This is not particularly limited in this application.

In this application, the first modulator may be a circuit or a mechanical unit that has a phase modulation function.

In a possible implementation, the first modulator may further adjust an amplitude of the first radio frequency sub-signal.

As an example instead of a limitation, the first modulator includes a divider and a phase shifter.

To be specific, the first radio frequency sub-signal may be divided into two signals by using the divider, and a phase difference between the two signals is adjusted by using the phase shifter, to adjust the first electrical azimuth.

Similarly, in this application, the second modulator may be a circuit or a mechanical unit that has a phase modulation function.

In a possible implementation, the second modulator may further adjust an amplitude of the second radio frequency sub-signal.

For example, the second modulator includes a divider and a phase shifter.

To be specific, the second radio frequency sub-signal may be divided into two signals by using the divider, and a phase difference between the two signals is adjusted by using the phase shifter, to adjust the second electrical azimuth.

In an implementation, the antenna system further includes a first controller and a second controller. The first controller is configured to control, based on the target azimuth corresponding to the first radio frequency signal and the first mechanical azimuth, the first modulator to perform the first processing. The second controller is configured to control, based on the target azimuth corresponding to the first radio frequency signal and the second mechanical azimuth, the second modulator to perform the second processing.

In another implementation, the first controller may be disposed or integrated into the first modulator, or the second controller may be disposed or integrated into the second modulator.

In a possible implementation, the antenna system further includes the first sensor, communicatively connected to the first controller, and configured to detect the first mechanical azimuth and send indication information of the first mechanical azimuth to the first controller.

In another possible implementation, the antenna system further includes the second sensor, communicatively connected to the second controller, and configured to detect the second mechanical azimuth and send indication information of the second mechanical azimuth to the second controller.

As an example instead of a limitation, when both the first mechanical azimuth and the second mechanical azimuth are 0, the first antenna and the second antenna are coplanar.

Alternatively, when both the first mechanical azimuth and the second mechanical azimuth are 0, the first antenna and the second antenna are non-coplanar.

As an example instead of a limitation, the antenna system further includes a third modulator. The third modulator is configured to perform third processing on a target radio frequency sub-signal, to adjust a phase difference between the first radio frequency sub-signal and the second radio frequency sub-signal. The target radio frequency sub-signal is at least one of the first radio frequency sub-signal and the second radio frequency sub-signal.

Therefore, a time interval between sending moments of the first radio frequency sub-signal and the second radio frequency sub-signal can be adjusted by adjusting the phase difference between the first radio frequency sub-signal and the second radio frequency sub-signal, to compensate for a deviation that is between transmission duration of the first radio frequency sub-signal and the second radio frequency sub-signal from being sent from the antenna to reaching a receiving end and that is caused by the different azimuths of the first antenna and the second antenna, so that the receiving end can synchronously receive the first radio frequency sub-signal and the second radio frequency sub-signal, and accuracy and reliability of communication are improved.

In an implementation, the phase difference P is determined based on first information, and the first information includes at least one of the following: a wavelength $\lambda$ of the first radio frequency signal, the first mechanical azimuth $\varphi 1$, the second mechanical azimuth $\varphi 2$, the first electrical azimuth $\theta 1$, or the second electrical azimuth $\theta 2$.

For example, when the first antenna and the second antenna are arranged left and right in a horizontal direction, the target radio frequency sub-signal is one of the first radio frequency sub-signal and the second radio frequency sub-signal that is sent by using a target antenna. The target antenna is one of the first antenna and the second antenna that is closer to an orientation of the target azimuth in the horizontal direction.

In this case, the first information further includes a length M of the target antenna and a distance L between the first antenna and the second antenna in a first direction when both the first mechanical azimuth and the second mechanical azimuth are 0. The first direction is parallel to a plane on which an antenna panel of the antennas is located when both the mechanical azimuths are 0.

As an example instead of a limitation, the phase difference P is determined based on the following formula:

$$P=2\pi*(L*\sin(\varphi 1+\theta 1)+M*\sin(\varphi 2+\theta 2)/\lambda).$$

In another implementation, if the first antenna and the second antenna are non-coplanar when both the first mechanical azimuth and the second mechanical azimuth are 0, the first information further includes a distance N between the first antenna and the second antenna in a second direction when both the first mechanical azimuth and the second mechanical azimuth are 0. The second direction is perpendicular to the plane on which the antenna panel of the antennas is located when both the mechanical azimuths are 0.

It should be understood that the foregoing describes the antenna system in the fourth aspect and the possible implementations of the fourth aspect by using functions of the components when a signal is sent as an example. However, this application is not limited thereto. The antenna system in the fourth aspect and the possible implementations of the fourth aspect is also applicable to a signal receiving process. For example, a signal received by the first antenna is denoted as a signal 1, and a signal received by the second antenna is denoted as a signal 2, where the signal 1 and the signal 2 have a same wavelength and carry same data. The first modulator is configured to process the signal 1 (corresponding to the foregoing first processing, for example, phase shifting processing), and the second modulator is configured to process the signal 2 (corresponding to the foregoing second processing, for example, phase shifting processing). In addition, the divider may implement a function of a combiner in the signal receiving process. To be specific, the divider is configured to combine a signal 1 and a signal 2 that are processed by the modulators, and send a combined signal to the radio frequency unit. It should be noted that the foregoing signal receiving process is merely an example for description, and is not particularly limited in this application. The signal receiving process is an inverse process of a signal sending process. To avoid repetition, detailed descriptions thereof are omitted.

According to a fifth aspect, an antenna system is provided, including a first antenna, a second antenna, a radio frequency unit, a first modulator, and a second modulator. The first antenna is capable of rotating around a first rotation axis to adjust a first mechanical azimuth of the first antenna, and the second antenna is capable of rotating around a second rotation axis to adjust a second mechanical azimuth of the second antenna. The radio frequency unit is configured to generate a first radio frequency signal and a second radio frequency signal that are to be sent, where the first radio frequency signal and the second radio frequency signal have a same wavelength, the first radio frequency signal and the second radio frequency signal carry same data, and the first radio frequency signal and the second radio frequency signal have a same target azimuth. The first modulator is configured to perform first processing on the first radio frequency signal, to adjust a first electrical azimuth of the first radio frequency signal, where the first electrical azimuth is determined based on the target azimuth and the first mechanical azimuth. The second modulator is configured to perform second processing on the second radio frequency signal, to adjust a second electrical azimuth of the second radio frequency sub-signal, where the second electrical azimuth is determined based on the target azimuth and the second mechanical azimuth. The first antenna is configured to transmit a first radio frequency sub-signal on which the first processing is performed. The first antenna is configured to transmit a second radio frequency sub-signal on which the second processing is performed.

According to the solution provided in this application, two antennas that are configured to send signals that have a same wavelength and carry same data are separately configured (where specifically, mechanical azimuths of the antennas can be separately configured through adjustment), and a modulator for adjusting an electrical azimuth of each antenna is separately disposed for each antenna. Therefore, even if at least one of the first antenna and the second antenna shares a same antenna panel with another antenna, coverage of the signal sent by using the two antennas can be adjusted by adjusting the electrical azimuth, so that communication flexibility can be improved on the premise of saving antenna panel resources.

As an example instead of a limitation, the antenna system further includes a first sensor configured to detect the first mechanical azimuth and a second sensor configured to detect the second mechanical azimuth.

In an implementation, the antenna system further includes a third antenna, disposed on the first antenna.

In another implementation, the antenna system further includes a fourth antenna, disposed on the second antenna.

For example, the third antenna is an active antenna, and the fourth antenna is an active antenna.

In addition, the first antenna is a passive antenna, and the second antenna is a passive antenna.

For another example, the third antenna is a passive antenna, and the fourth antenna is a passive antenna.

In addition, the first antenna is an active antenna, and the second antenna is an active antenna.

In this application, the first rotation axis and the second rotation axis are disposed in parallel.

In addition, the first rotation axis may be disposed at any location such as an edge or a center of the first antenna.

The second rotation axis may be disposed at any location such as an edge or a center of the first antenna. This is not particularly limited in this application.

In this application, the first modulator may be a circuit or a mechanical unit that has a phase modulation function.

In a possible implementation, the first modulator may further adjust an amplitude of the first radio frequency signal.

As an example instead of a limitation, the first modulator includes a divider and a phase shifter.

To be specific, the first radio frequency signal may be divided into two signals by using the divider, and a phase difference between the two signals is adjusted by using the phase shifter, to adjust the first electrical azimuth.

Similarly, the second modulator may be a circuit or a mechanical unit that has a phase modulation function.

In a possible implementation, the second modulator may further adjust an amplitude of the second radio frequency signal.

For example, the second modulator includes a divider and a phase shifter.

To be specific, the second radio frequency signal may be divided into two signals by using the divider, and a phase difference between the two signals is adjusted by using the phase shifter, to adjust the second electrical azimuth.

Optionally, the antenna system further includes a first controller and a second controller. The first controller is configured to control, based on the target azimuth corresponding to the first radio frequency signal and the first mechanical azimuth, the first modulator to perform the first processing. The second controller is configured to control, based on the target azimuth corresponding to the first radio frequency signal and the second mechanical azimuth, the second modulator to perform the second processing.

In another implementation, the first controller may be disposed or integrated into the first modulator, or the second controller may be disposed or integrated into the second modulator.

Optionally, when both the first mechanical azimuth and the second mechanical azimuth are 0, the first antenna and the second antenna are coplanar.

In this application, there is a phase difference P between the first radio frequency signal and the second radio frequency signal that are generated by the radio frequency unit.

Therefore, a time interval between sending moments of the first radio frequency signal and the second radio frequency signal can be adjusted by adjusting the phase difference between the first radio frequency signal and the second radio frequency signal, to compensate for a deviation that is between transmission duration of the first radio frequency signal and the second radio frequency signal from being sent from the antenna to reaching a receiving end and that is caused by the different azimuths of the first antenna and the second antenna, so that the receiving end can synchronously receive the first radio frequency signal and the second radio frequency signal, and accuracy and reliability of communication are improved.

In an implementation, the phase difference P is determined based on first information, and the first information includes at least one of the following: a wavelength $\lambda$ of the first radio frequency signal, the first mechanical azimuth $\varphi 1$, the second mechanical azimuth $\varphi 2$, the first electrical azimuth $\theta 1$, or the second electrical azimuth $\theta 2$.

In addition, when the first antenna and the second antenna are arranged left and right in a horizontal direction, the first information further includes a length M of a target antenna and a distance L between the first antenna and the second antenna in the horizontal direction when both the first mechanical azimuth and the second mechanical azimuth are 0. The target antenna is one of the first antenna and the second antenna that is closer to an orientation of the target azimuth in the horizontal direction.

Optionally, the phase difference P is determined based on the following formula:

$$P=2\pi*(L*\sin(\varphi 1+\theta 1)+M*\sin(\varphi 2+\theta 2)/\lambda).$$

In addition, if the first antenna and the second antenna are non-coplanar when both the first mechanical azimuth and the second mechanical azimuth are 0, the first information further includes a distance N between the first antenna and the second antenna in a second direction when both the first mechanical azimuth and the second mechanical azimuth are 0. The second direction is perpendicular to a plane on which the first antenna is located when the first mechanical azimuth is 0.

It should be understood that the foregoing describes the antenna system in the fifth aspect and the possible implementations of the fifth aspect by using functions of the components when a signal is sent as an example. However, this application is not limited thereto. The antenna system in the fifth aspect and the possible implementations of the fifth aspect is also applicable to a signal receiving process. For example, a signal received by the first antenna is denoted as a signal 3, and a signal received by the second antenna is denoted as a signal 4, where the signal 3 and the signal 4 have a same wavelength and carry same data. The first modulator is configured to process the signal 3 (corresponding to the foregoing first processing, for example, phase shifting processing), and the second modulator is configured to process the signal 4 (corresponding to the foregoing second processing, for example, phase shifting processing). In addition, the divider may implement a function of a combiner in the signal receiving process. To be specific, the divider is configured to combine a signal 3 and a signal 4 that are processed by the modulators, and send a combined signal to the radio frequency unit. It should be noted that the foregoing signal receiving process is merely an example for description, and is not particularly limited in this application. The signal receiving process is an inverse process of a signal sending process. To avoid repetition, detailed descriptions thereof are omitted.

According to a sixth aspect, an antenna system is provided, including a first antenna, a second antenna, and a radio frequency unit. The first antenna is capable of rotating around a first rotation axis to adjust a first mechanical azimuth of the first antenna, and the second antenna is capable of rotating around a second rotation axis to adjust a second mechanical azimuth of the second antenna. The radio frequency unit is configured to generate a first radio frequency signal, a second radio frequency signal, a third radio frequency signal, and a fourth radio frequency signal that are to be sent. The first radio frequency signal, the second radio frequency signal, the third radio frequency signal, and the fourth radio frequency signal have a same wavelength, the first radio frequency signal, the second radio frequency signal, the third radio frequency signal, and the fourth radio frequency signal carry same data, and the first radio frequency signal, the second radio frequency signal, the third radio frequency signal, and the fourth radio frequency signal have a same target azimuth. There is a first phase difference between the first radio frequency signal and the second radio frequency signal, and there is a second phase difference between the third radio frequency signal and the fourth radio frequency signal. The first phase difference is determined based on the target azimuth and the first mechanical azimuth, and the second phase difference is determined based on the target azimuth and the second mechanical azimuth. The first antenna is configured to transmit the first radio frequency signal and the second radio frequency signal. The second antenna is configured to transmit the third radio frequency signal and the fourth radio frequency signal.

According to the solution provided in this application, two antennas that are configured to send signals that have a same wavelength and carry same data are separately configured (where specifically, mechanical azimuths of the antennas can be separately configured through adjustment), an electrical azimuth of the first antenna is adjusted by using the phase difference between the first radio frequency signal and the second radio frequency signal, and an electrical azimuth of the second antenna is adjusted by using the phase difference between the third radio frequency signal and the fourth radio frequency signal. Therefore, even if at least one of the first antenna and the second antenna shares a same antenna panel with another antenna, coverage of the signal sent by using the two antennas can be adjusted by adjusting the electrical azimuth, so that communication flexibility can be improved on the premise of saving antenna panel resources.

As an example instead of a limitation, the antenna system further includes a first sensor configured to detect the first mechanical azimuth and a second sensor configured to detect the second mechanical azimuth.

In an implementation, the antenna system further includes a third antenna, disposed on the first antenna.

In another implementation, the antenna system further includes a fourth antenna, disposed on the second antenna.

For example, the third antenna is an active antenna, and the fourth antenna is an active antenna.

In addition, the first antenna is a passive antenna, and the second antenna is a passive antenna.

For another example, the third antenna is a passive antenna, and the fourth antenna is a passive antenna.

In addition, the first antenna is an active antenna, and the second antenna is an active antenna.

In this application, the first rotation axis and the second rotation axis are disposed in parallel.

In addition, the first rotation axis may be disposed at any location such as an edge or a center of the first antenna.

The second rotation axis may be disposed at any location such as an edge or a center of the first antenna. This is not particularly limited in this application.

Optionally, when both the first mechanical azimuth and the second mechanical azimuth are 0, the first antenna and the second antenna are coplanar.

Optionally, there is a third phase difference P between a fifth radio frequency signal and a sixth radio frequency signal. The fifth radio frequency signal is a signal with a lagging phase in the first radio frequency signal and the second radio frequency signal. The sixth radio frequency signal is a signal with a lagging phase in the third radio frequency signal and the fourth radio frequency signal.

Optionally, the third phase difference P is determined based on first information, and the first information includes at least one of the following: a wavelength $\lambda$ of the first radio frequency signal, the first mechanical azimuth $\varphi 1$, the second mechanical azimuth $\varphi 2$, a first electrical azimuth $\theta 1$, or a second electrical azimuth $\theta 2$.

Optionally, when the first antenna and the second antenna are arranged left and right in a horizontal direction, the first information further includes a length M of a target antenna and a distance L between the first antenna and the second antenna in the horizontal direction when both the first mechanical azimuth and the second mechanical azimuth are 0. The target antenna is one of the first antenna and the second antenna that is closer to an orientation of the target azimuth in the horizontal direction.

Optionally, the third phase difference P is determined based on the following formula:

$$P=2\pi*(L*\sin(\varphi+\theta 1)+M*\sin(\varphi 2+\theta 2)/\lambda).$$

Optionally, if the first antenna and the second antenna are non-coplanar when both the first mechanical azimuth and the second mechanical azimuth are 0, the first information further includes a distance N between the first antenna and the second antenna in a second direction when both the first mechanical azimuth and the second mechanical azimuth are 0. The second direction is perpendicular to a plane on which an antenna panel of the first antenna is located when the first mechanical azimuth is 0.

It should be understood that the foregoing describes the antenna system in the sixth aspect and the possible implementations of the sixth aspect by using functions of the components when a signal is sent as an example. However, this application is not limited thereto. The antenna system in the sixth aspect and the possible implementations of the sixth aspect is also applicable to a signal receiving process. For example, a signal received by the first antenna is denoted as a signal 3, and a signal received by the second antenna is denoted as a signal 4, where the signal 3 and the signal 4 have a same wavelength and carry same data. The first modulator is configured to process the signal 3 (corresponding to the foregoing first processing, for example, phase shifting processing), and the second modulator is configured to process the signal 4 (corresponding to the foregoing second processing, for example, phase shifting processing). In addition, the divider may implement a function of a combiner in the signal receiving process. To be specific, the divider is configured to combine a signal 3 and a signal 4 that are processed by the modulators, and send a combined signal to the radio frequency unit. It should be noted that the foregoing signal receiving process is merely an example for description, and is not particularly limited in this application. The signal receiving process is an inverse process of a signal sending process. To avoid repetition, detailed descriptions thereof are omitted.

DESCRIPTION OF EMBODIMENTS

Figure 1:
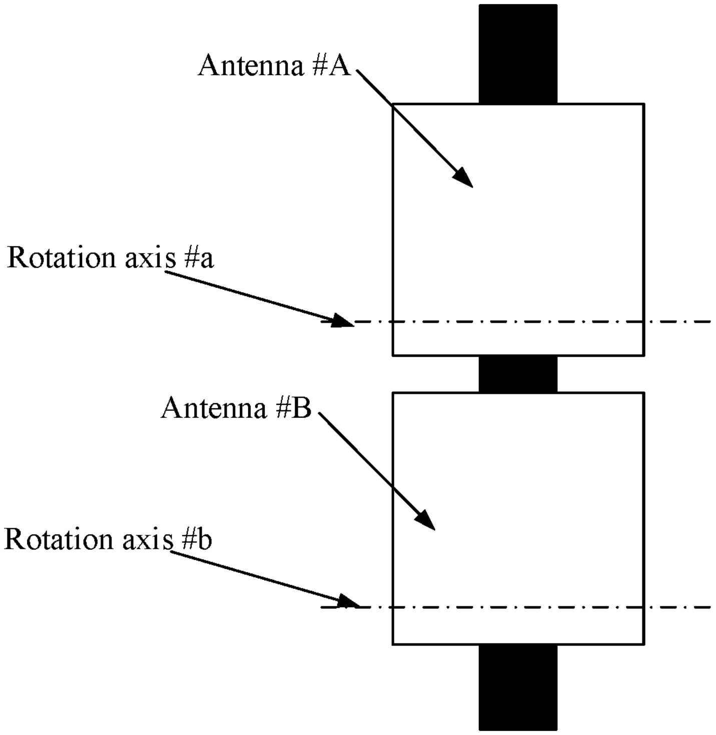
FIG. 1 is a schematic diagram of a front view of an example of an antenna arrangement manner according to this application.

The following describes technical solutions of this application with reference to accompanying drawings.

The technical solutions of embodiments of this application may be applied to various communication systems, such as a global system for mobile communications (Global System for Mobile communications, GSM), a code division multiple access (Code Division Multiple Access, CDMA) system, a wideband code division multiple access (Wideband Code Division Multiple Access, WCDMA) system, a general packet radio service (General Packet Radio Service, GPRS) system, a long term evolution (Long Term Evolution, LTE) system, an LTE frequency division duplex (Frequency Division Duplex, FDD) system, an LTE time division duplex (Time Division Duplex, TDD) system, a universal mobile telecommunications system (Universal Mobile Telecommunications System, UMTS), a worldwide interoperability for microwave access (Worldwide Interoperability for Microwave Access, WiMAX) communication system, a 5th generation (5th Generation, 5G) system, or a new radio (New Radio, NR) system.

An antenna system provided in this application may be applied to a network device, and in particular, may be applied to a scenario in which a plurality of (two or more) antennas (or antenna arrays) configured to transmit different data (or belonging to different operators) need to be disposed on a same panel.

The network device in embodiments of this application may be a device configured to communicate with a terminal device. The network device may be a base transceiver station (Base Transceiver Station, BTS) in a global system for mobile communications (Global System for Mobile communications, GSM) system or a code division multiple access (Code Division Multiple Access, CDMA) system, a NodeB (NodeB, NB) in a wideband code division multiple access (Wideband Code Division Multiple Access, WCDMA) system, an evolved NodeB (Evolved NodeB, eNB or eNodeB) in an LTE system, or a radio controller in a cloud radio access network (Cloud Radio Access Network, CRAN) scenario. Alternatively, the network device may be a relay node, an access point, a vehicle-mounted device, a wearable device, a network device in a future 5G network, a network device in a future evolved PLMN network, or the like. This is not limited in embodiments of this application.

The antenna system in this application includes a plurality of (or at least two) antennas.

In this application, the antenna may also be referred to as an antenna panel or an antenna array, that is, the antenna is formed in a planar shape (or a plate shape).

In this application, arrangement between any two of the plurality of antennas may be the same or similar. For ease of understanding and description, arrangement between an antenna #A and an antenna #B in the plurality of antennas is used as an example for description.

The antenna #A and the antenna #B are arranged in a manner in which mechanical downtilts can be separately adjusted.

Specifically, the antenna #A and the antenna #B can rotate around different rotation axes. For ease of understanding and description, a rotation axis of the antenna #A is denoted as a rotation axis #a, and a rotation axis of the antenna #B is denoted as a rotation axis #b. In an implementation, the rotation axis #a and the rotation axis #b may extend in a horizontal direction, so that downtilts (specifically, the mechanical downtilts) of the antenna #A and the antenna #B can be adjusted by adjusting rotation angles of the antenna #A and the antenna #B around the respective rotation axes. It should be noted that location relationships, shown in FIG. 1 to FIG. 3, between the rotation axis #a and the antenna #A are merely examples for description, and this application is not limited thereto. A person skilled in the art may randomly set the location relationship between the rotation axis #a and the antenna #A depending on an actual requirement, provided that the antenna #A can rotate around the rotation axis #a. Similarly, location relationships, shown in FIG. 1 to FIG. 3, between the rotation axis #b and the antenna #B are merely examples for description, and this application is not limited thereto. A person skilled in the art may randomly set the location relationship between the rotation axis #b and the antenna #B depending on an actual requirement, provided that the antenna #B can rotate around the rotation axis #b.

As shown in FIG. 1, in an implementation, the antenna #A and the antenna #B are arranged up and down.

In this application, "arranged up and down" may be understood as being arranged up and down in a vertical direction (or a perpendicular direction or a gravity direction).

Figure 2:
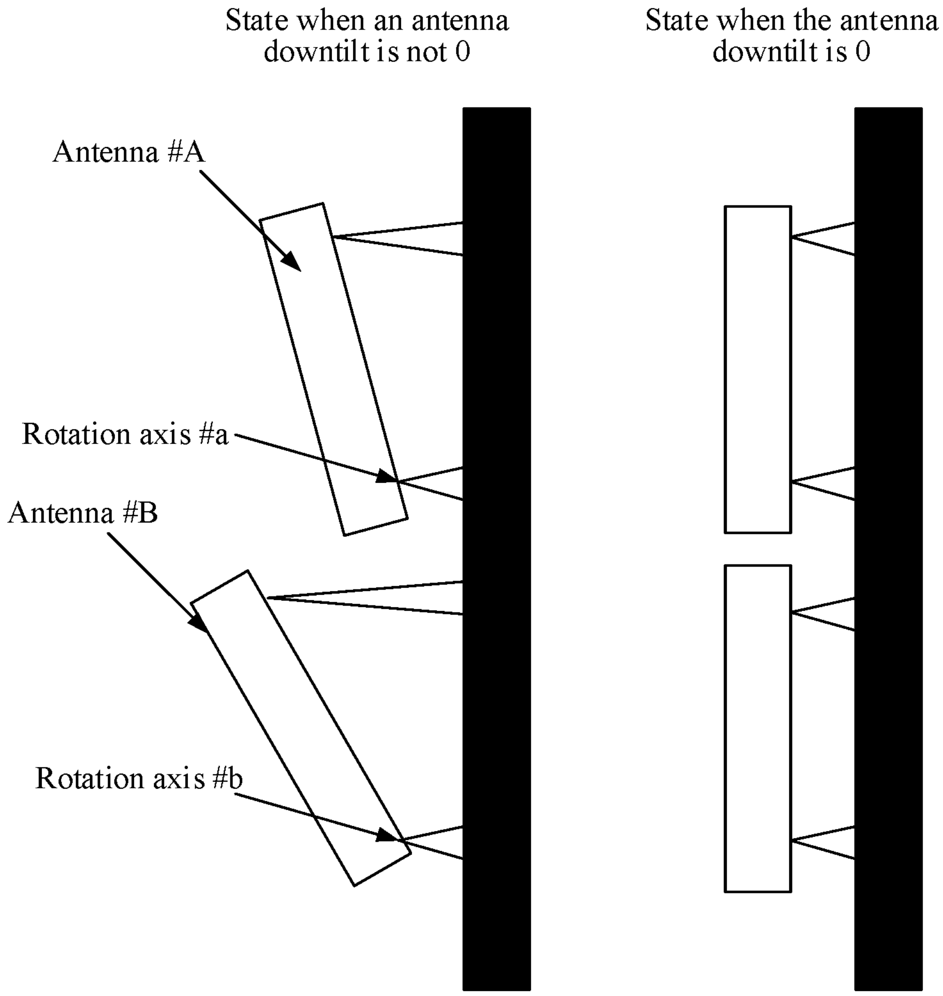
FIG. 2 is a schematic diagram of a side view of another example of an antenna arrangement manner according to this application.

In addition, for example, the rotation axis #a and the rotation axis #b are coplanar in the vertical direction. In other words, as shown in FIG. 2, when the mechanical downtilts of the antenna #A and the antenna #B are not 0, the antenna #A and the antenna #B are coplanar.

It should be noted that, in this application, that an angle is 0 may be understood as that the angle is 0°.

Figure 3:
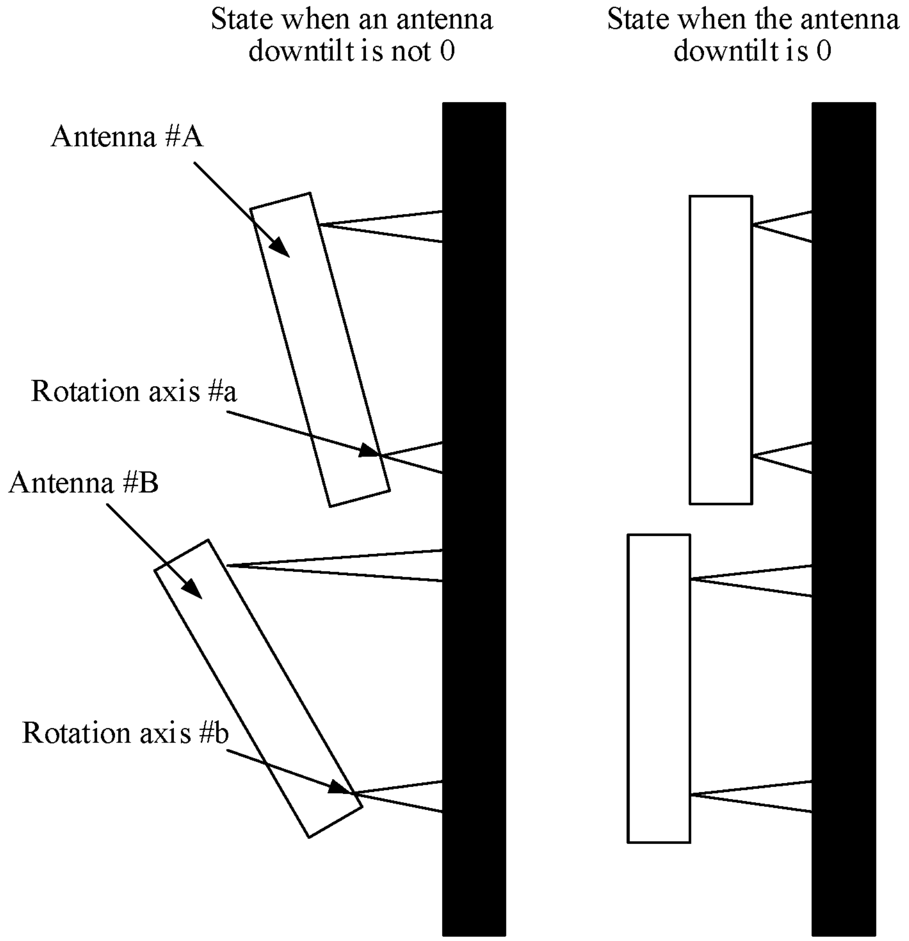
FIG. 3 is a schematic diagram of a side view of still another example of an antenna arrangement manner according to this application.

For another example, the rotation axis #a and the rotation axis #b are non-coplanar in the vertical direction. In other words, as shown in FIG. 3, when the mechanical downtilts of the antenna #A and the antenna #B are not 0, the antenna #A and the antenna #B are non-coplanar. To be specific, when the mechanical downtilts of the antenna #A and the antenna #B are not 0, there is a gap, which is denoted as N, between a plane on which the antenna #A is located and a plane on which the antenna #B is located.

Figure 4:
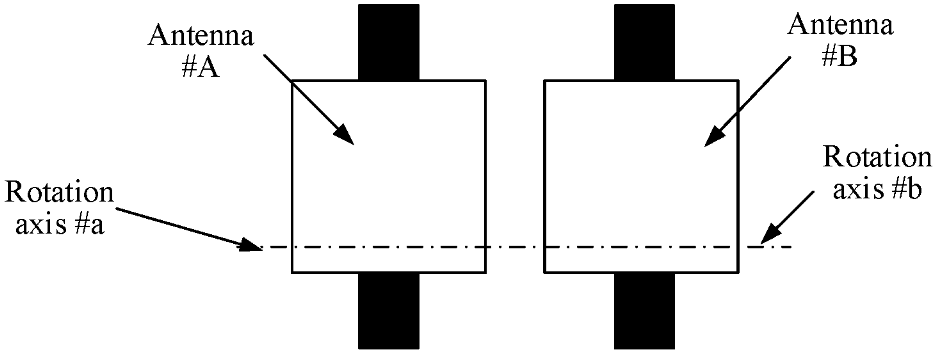
FIG. 4 is a schematic diagram of a front view of still another example of an antenna arrangement manner according to this application.

As shown in FIG. 4, in another implementation, the antenna #A and the antenna #B are arranged left and right.

In this application, "arranged left and right" may be understood as being arranged in parallel in a horizontal direction.

Figure 5:
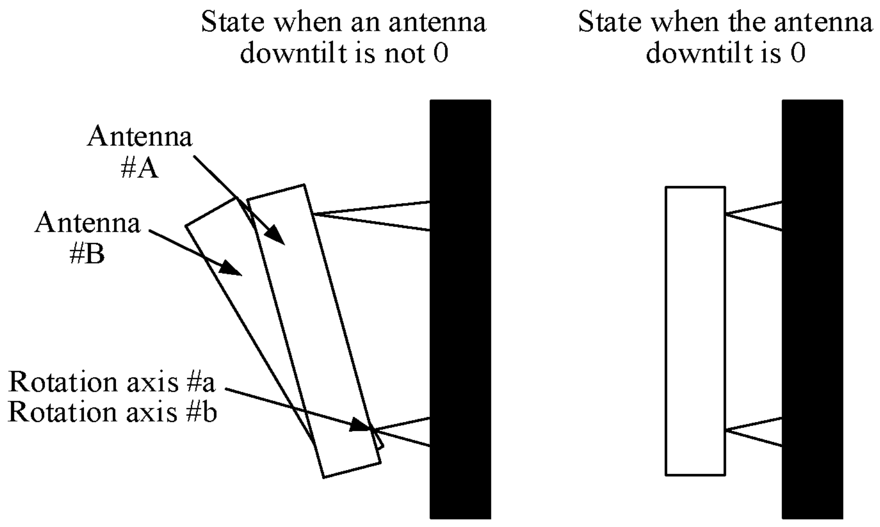
FIG. 5 is a schematic diagram of a side view of still another example of an antenna arrangement manner according to this application.

In addition, for example, the rotation axis #a and the rotation axis #b are coplanar in the horizontal direction. In other words, as shown in FIG. 5, when the mechanical downtilts of the antenna #A and the antenna #B are the same, the antenna #A and the antenna #B are coplanar.

Figure 6:
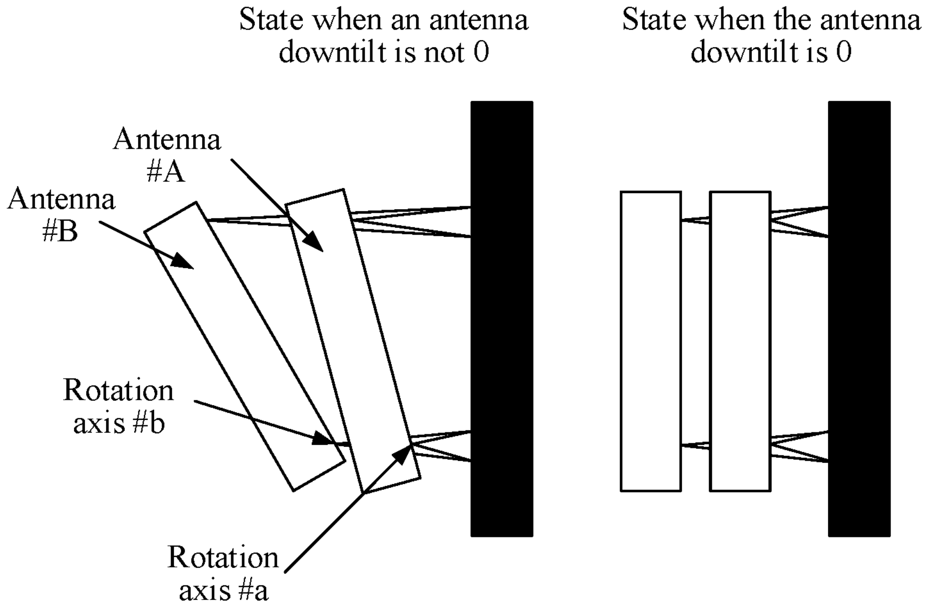
FIG. 6 is a schematic diagram of a side view of still another example of an antenna arrangement manner according to this application.

For another example, the rotation axis #a and the rotation axis #b are non-coplanar in the horizontal direction. In other words, as shown in FIG. 6, when the mechanical downtilts of the antenna #A and the antenna #B are the same, the antenna #A and the antenna #B are non-coplanar. To be specific, when the mechanical downtilts of the antenna #A and the antenna #B are the same, there is a gap, which is denoted as T, between a plane on which the antenna #A is located and a plane on which the antenna #B is located.

Figure 7:
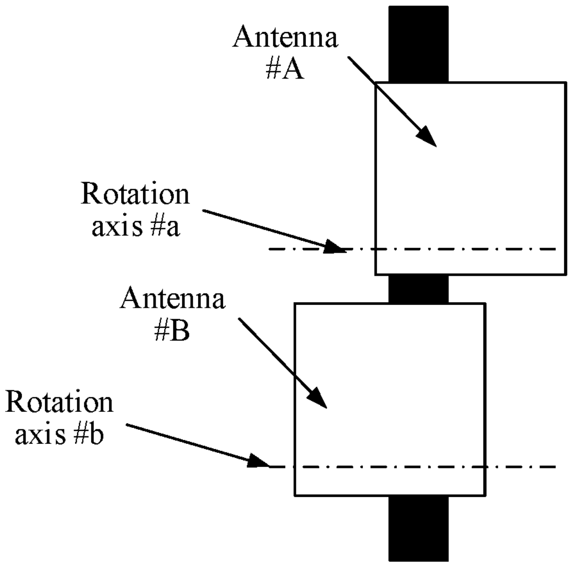
FIG. 7 is a schematic diagram of a front view of still another example of an antenna arrangement manner according to this application.
Figure 8:
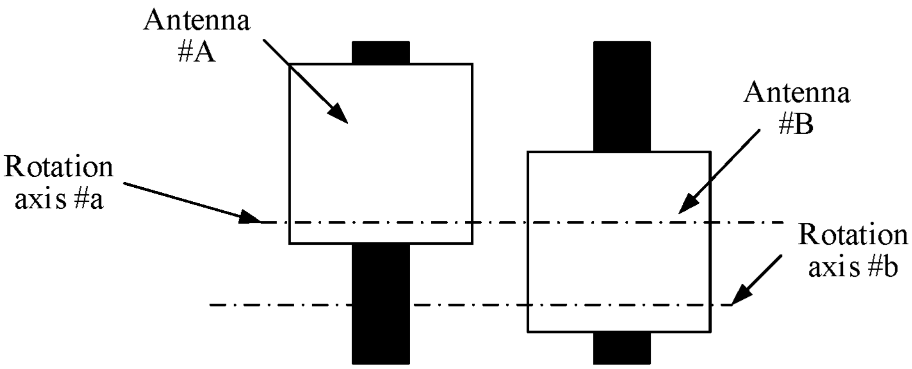
FIG. 8 is a schematic diagram of a side view of still another example of an antenna arrangement manner according to this application.

It should be understood that the foregoing arrangement between the antenna #A and the antenna #B are merely examples for description, and this application is not limited thereto. For example, as shown in FIG. 7, when the antenna #A and the antenna #B are arranged up and down, there may be a deviation between locations of the antenna #A and the antenna #B in the horizontal direction. For another example, as shown in FIG. 8, when the antenna #A and the antenna #B are arranged left and right, there may be a deviation between locations of the antenna #A and the antenna #B in the vertical direction.

In a possible implementation, the antenna #A and the antenna #B are configured to transmit same data (which is denoted as data #1).

In another possible implementation, the antenna #A and the antenna #B are configured to transmit signals having a same wavelength.

In a possible implementation, another antenna may be disposed on at least one of the antenna #A and the antenna #B.

Figure 9:
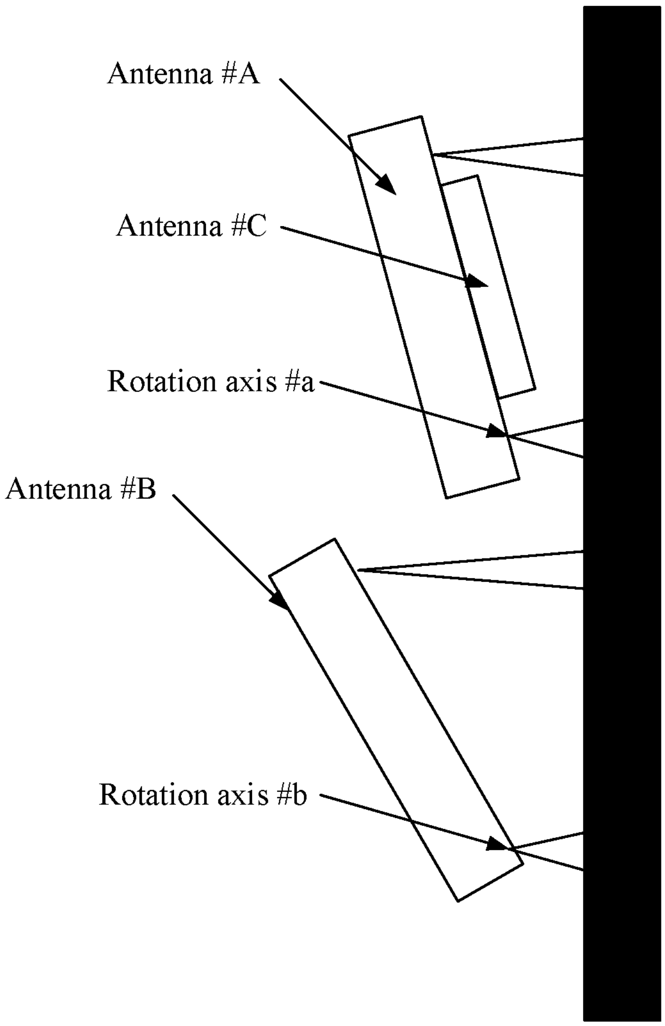
FIG. 9 is a schematic diagram of a side view of still another example of an antenna arrangement manner according to this application.

For example, as shown in FIG. 9, an antenna #C is disposed on one of the antenna #A and the antenna #B (for example, the antenna #A), where data (which is denoted as data #2) transmitted by the antenna #C is different from the data #1.

Figure 10:
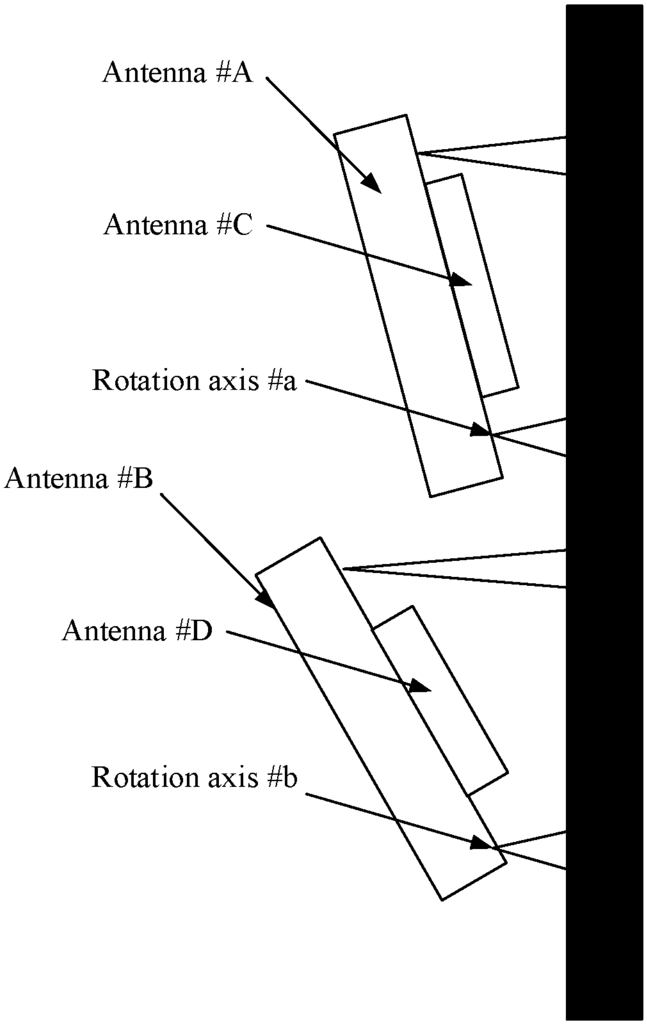
FIG. 10 is a schematic diagram of a side view of still another example of an antenna arrangement manner according to this application.

For another example, as shown in FIG. 10, an antenna #C is disposed on the antenna #A, where data (which is denoted as data #2) transmitted by the antenna #C is different from the data #1. In addition, an antenna #D is disposed on the antenna #B, where data (which is denoted as data #3) transmitted by the antenna #D is different from the data #1. In addition, the data #2 and the data #3 may be the same or may be different. This is not particularly limited in this application.

In an implementation, both the antenna #A and the antenna #B may be passive antennas (Passive Antennas).

In this case, the antenna #C and/or the antenna #D may be active antennas, in other words, active antenna units (Active Antenna Units, AAUs). The AAU combines an active unit (such as an amplifier, a digital-to-analog converter, or an analog-to-digital converter) related to a transceiver with a passive antenna, to form an entire unit.

Alternatively, the antenna #C and/or the antenna #D may be passive antennas.

In another implementation, both the antenna #A and the antenna #B may be active antennas. In this case, the antenna #C and/or the antenna #D may be active antennas, or the antenna #C and/or the antenna #D may be passive antennas.

In addition, in this application, coverage of the signals sent by the antenna #A and the antenna #B are the same (or approximately the same). In other words, target downtilts of the antenna #A and the antenna #B are the same.

The following describes in detail an antenna system with the foregoing arrangement and a solution in which antennas can have a same target downtilt.

Figure 11:
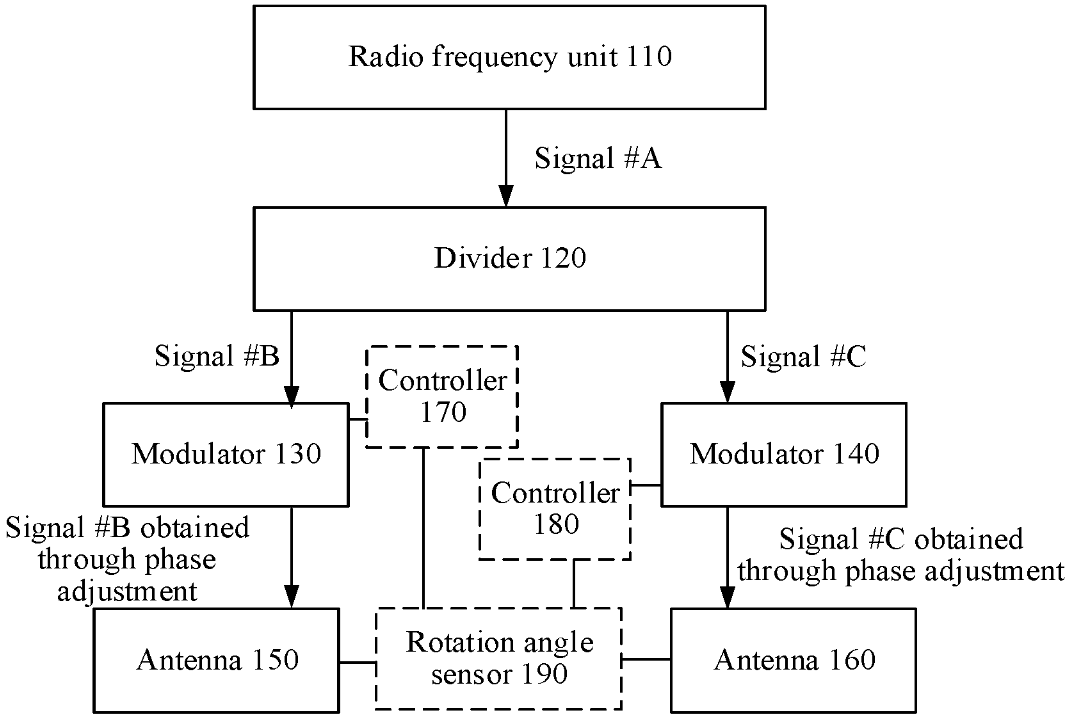
FIG. 11 is a schematic diagram of an example of an antenna system according to this application.

FIG. 11 is a schematic diagram of an example of an antenna system according to this application. As shown in FIG. 11, the antenna system includes a radio frequency unit 110, a divider 120, a modulator 130 (an example of a first modulator), a modulator 140 (an example of a second modulator), an antenna 150 (an example of a first antenna), and an antenna 160 (an example of a second antenna).

The following separately describes functions and structures of the foregoing components in detail.

A. Antenna

The antenna system includes at least two antennas. Arrangement between any two of the at least two antennas is similar to the foregoing arrangement between the antenna #A and the antenna #B. For ease of understanding, a case in which the antenna system includes two antennas, namely, the antenna 150 and the antenna 160, is used for description herein.

Mechanical downtilts of the antenna 150 and the antenna 160 may be different.

For example, when the antenna 150 is a passive antenna, a mechanical downtilt of the antenna 150 may be determined depending on a signal coverage requirement of an active antenna disposed on the antenna 150.

For another example, when the antenna 160 is a passive antenna, a mechanical downtilt of the antenna 160 may be determined depending on a signal coverage requirement of an active antenna disposed on the antenna 160.

In addition, in this application, a signal transmitted by the antenna 150 and a signal transmitted by the antenna 160 carry same data, wavelengths of the signals are the same, and target downtilts of the antenna 150 and the antenna 160 are the same.

For ease of understanding and description, the target downtilts of the antenna 150 and the antenna 160 are denoted as δ below.

B. Radio Frequency Unit 110

The radio frequency unit 110 is configured to generate a radio frequency signal (which denoted as a signal #A), where the radio frequency unit may be a remote radio unit (Remote Radio Unit, RRU). In addition, a process in which the radio frequency unit generates the radio frequency signal may be similar to that in a conventional technology. To avoid repetition, detailed descriptions thereof are omitted herein.

In addition, the radio frequency unit 110 further includes an output end, configured to output the signal #A.

C. Divider 120

An input end of the divider 120 is connected to the output end of the radio frequency unit 110, and is configured to obtain the signal #A from the radio frequency unit 110 and perform dividing processing on the signal #A, to generate a signal #B and a signal #C. In addition, a process in which the divider performs dividing processing on a signal may be similar to that in a conventional technology. To avoid repetition, detailed descriptions thereof are omitted herein. Powers of the signal #B and the signal #C may be the same or may be different. This is not specifically limited in this application.

It should be noted that, when the antenna system includes K antennas (where K≥3), the divider 120 may divide the signal #A into K signals, where each signal corresponds to one antenna. To be specific, one signal is transmitted by using an antenna corresponding to the signal.

For ease of understanding, a case in which the signal #B is sent by using the antenna 150 and the signal #C is sent by using the antenna 160 is used as an example for description.

In addition, the divider 120 further includes two output ports (that is, K=2). One of the output ports is configured to output the signal #B, and the other output port is configured to output the signal #C.

D. Modulator

The antenna system includes at least two modulators. Specifically, a quantity of modulators is the same as a quantity of antennas. In other words, the at least two modulators are in a one-to-one correspondence with the at least two antennas, and each modulator is configured to process a signal sent by using an antenna corresponding to the modulator. For ease of understanding, a case in which the antenna system includes two modulators, namely, the modulator 130 (an example of the first modulator) and the modulator 140 (an example of the second modulator) is used for description herein.

For ease of understanding, a case in which the modulator 130 is configured to process the signal (the signal #B) sent by using the antenna 150, and the modulator 140 is configured to process the signal (the signal #C) sent by using the antenna 160 is used as an example for description.

In this case, an input port of the modulator 130 is connected to the output port of the divider for outputting the signal #B, and an input port of the modulator 140 is connected to the output port of the divider for outputting the signal #C.

In this application, the modulator 130 is configured to adjust an electrical downtilt (an example of a first electrical downtilt θ1) of the antenna 150 (or the signal #B) based on the target downtilt δ of the antenna 150 (or the signal #B) and the mechanical downtilt (an example of a first mechanical downtilt φ1) of the antenna 150.

As an example instead of a limitation, the modulator 130 may adjust the electrical downtilt of the antenna 150, to satisfy the following formula:

$$\delta=\theta 1+\varphi 1$$

In a possible implementation, the modulator 130 may include a divider and a phase modulator. The divider is configured to perform dividing processing on the signal #B, to divide the signal #B into two (or more) signals. The phase modulator is configured to adjust a phase difference between the two (or more) signals, to adjust the electrical downtilt. A method and a process of adjusting the electrical downtilt by adjusting the phase difference between the signals may be similar to those in a conventional technology. To avoid repetition, detailed descriptions thereof are omitted herein.

As an example instead of a limitation, the antenna system may further include a controller 170 (an example of a first controller 170). The controller 170 is configured to obtain the target downtilt δ and the mechanical downtilt φ1, and then control a processing parameter of the modulator 130 based on the target downtilt δ and the mechanical downtilt φ1, to implement the foregoing process of adjusting the electrical downtilt.

For example, the controller 170 may include but is not limited to a microcontroller (Microcontroller Unit, MCU).

In an implementation, the target downtilt δ and the mechanical downtilt φ1 may be input by an administrator or an operator to the modulator 130 or the controller 170.

In another implementation, the antenna system may further include a rotation angle sensor 190. The rotation angle sensor 190 is configured to detect the mechanical downtilt φ1. In addition, the modulator 130 or the controller 170 may be connected to the rotation angle sensor 190, to obtain information about the mechanical downtilt φ1 from the rotation angle sensor 190.

Similarly, the modulator 140 is configured to adjust an electrical downtilt (an example of a second electrical downtilt θ2) of the antenna 160 (or the signal #C) based on the target downtilt δ of the antenna 160 (or the signal #C) and the mechanical downtilt (an example of a second mechanical downtilt φ2) of the antenna 160.

The modulator 140 may adjust the electrical downtilt of the antenna 160, to satisfy the following formula:

$$\delta=\theta 2+\varphi 2$$

As an example instead of a limitation, the antenna system may further include a controller 180 (an example of a second controller 180). The controller 180 is configured to obtain the target downtilt δ and the mechanical downtilt φ2, and then control a processing parameter of the modulator 140 based on the target downtilt δ and the mechanical downtilt φ2, to implement the foregoing process of adjusting the electrical downtilt.

For example, the controller 180 may include but is not limited to a microcontroller (Microcontroller Unit, MCU).

In an implementation, the target downtilt δ and the mechanical downtilt φ2 may be input by an administrator or an operator to the modulator 140 or the controller 180.

In another implementation, the antenna system may further include a rotation angle sensor 190. The rotation angle sensor 195 is configured to detect the mechanical downtilt φ2. In addition, the modulator 140 or the controller 180 may be connected to the rotation angle sensor 195, to obtain information about the mechanical downtilt φ2 from the rotation angle sensor 195.

In addition, the modulator 130 includes an output port, configured to output a signal #B obtained through the foregoing electrical downtilt adjustment processing.

The modulator 140 includes an output port, configured to output a signal #C obtained through the foregoing electrical downtilt adjustment processing.

An input port of the antenna 150 is connected to the output port of the modulator 130, so that the signal #B obtained through the electrical downtilt adjustment processing can be obtained from the modulator 130, and the signal #B can be transmitted.

An input port of the antenna 160 is connected to the output port of the modulator 140, so that the signal #C obtained through the electrical downtilt adjustment processing can be obtained from the modulator 140, and the signal #C can be transmitted.

The antenna system provided in this application can be effectively applied to a case in which two (or more) antennas (for example, an active antenna and a passive antenna) are disposed on a same panel. In a conventional technology, when two antennas are disposed on a same antenna panel, different downtilts cannot be provided for the two antennas. Same as this, in this application, one of the antennas (for example, the passive antenna) may be divided into two parts that can separately adjust a mechanical downtilt. In addition, the mechanical downtilt of the passive antenna may be determined depending on a requirement of the active antenna on the mechanical downtilt, and an electrical downtilt of the passive antenna can be adjusted by disposing a modulator. Therefore, even if the mechanical downtilt of the passive antenna cannot satisfy a coverage requirement of a signal sent by using the passive antenna, the coverage requirement of the signal sent by using the passive antenna can still be satisfied by adjusting the electrical downtilt of the passive antenna.

In this application, because arrangement locations of the antenna 150 and the antenna 160 are different, and the mechanical downtilts of the antenna 150 and the antenna 160 are different, signals respectively sent by the antenna 150 and the antenna 160 may not reach a same location simultaneously, affecting communication quality.

Figure 12:
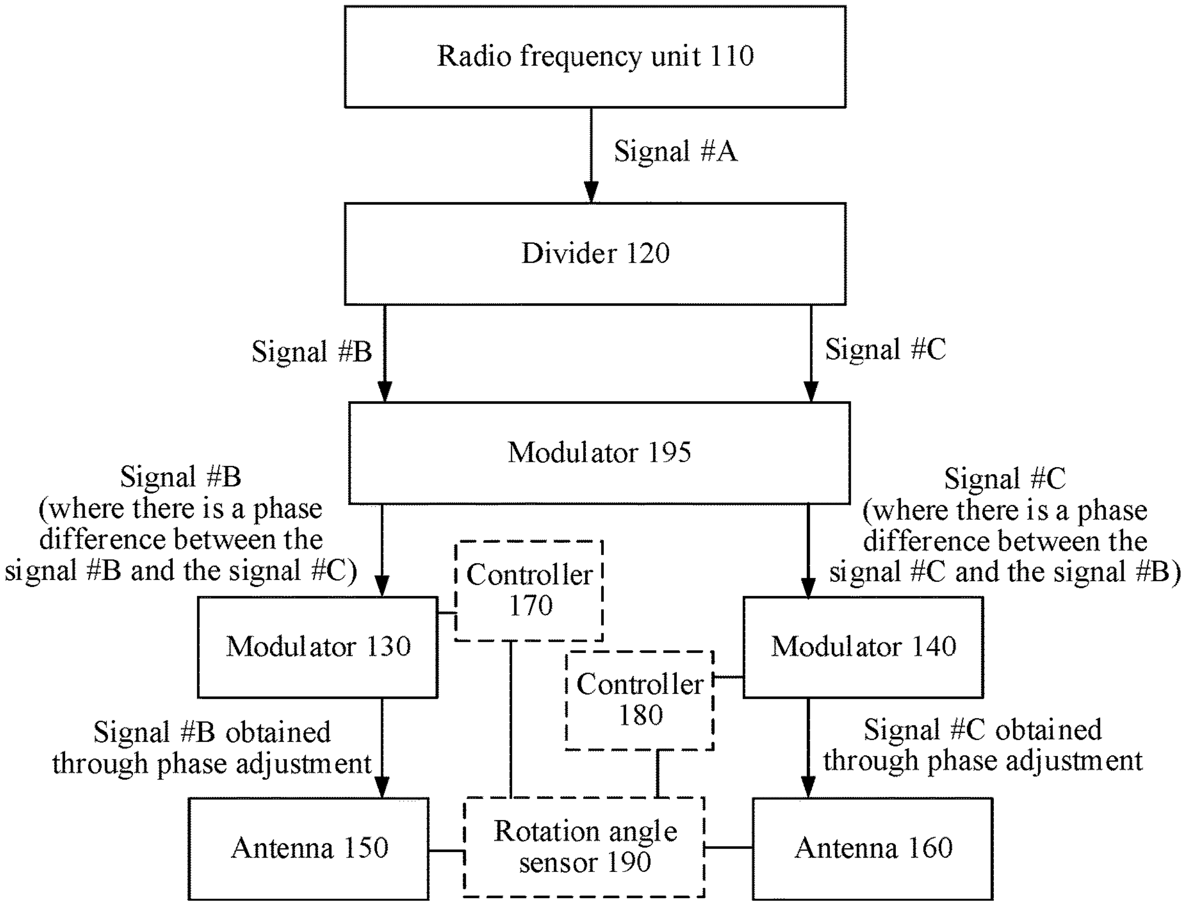
FIG. 12 is a schematic diagram of another example of an antenna system according to this application.

In this case, a modulator 197 (an example of a third modulator) may be further disposed in this application. The modulator 197 is connected to the divider, and is configured to adjust the signal #B and the signal #C that are output from the divider, to adjust a phase difference between the signal #B and the signal #C, so that the signals respectively sent by the antenna 150 and the antenna 160 can reach a same target simultaneously, or a time difference between arrival of the signals respectively sent by the antenna 150 and the antenna 160 at a same target falls within a preset range. FIG. 12 is a schematic diagram of an antenna system including the foregoing modulator 197. Different from the antenna system shown in FIG. 11, the output port of the divider is connected to the modulator 197, and two output ports of the modulator 197 are respectively configured to output the signal #B and the signal #C that are obtained through phase modulation.

In this application, the phase difference between the signal #B and the signal #C may be determined based on a radio frequency wave path difference D between the signal #B and the signal #C (or between the antenna 150 and the antenna 160).

Figure 13:
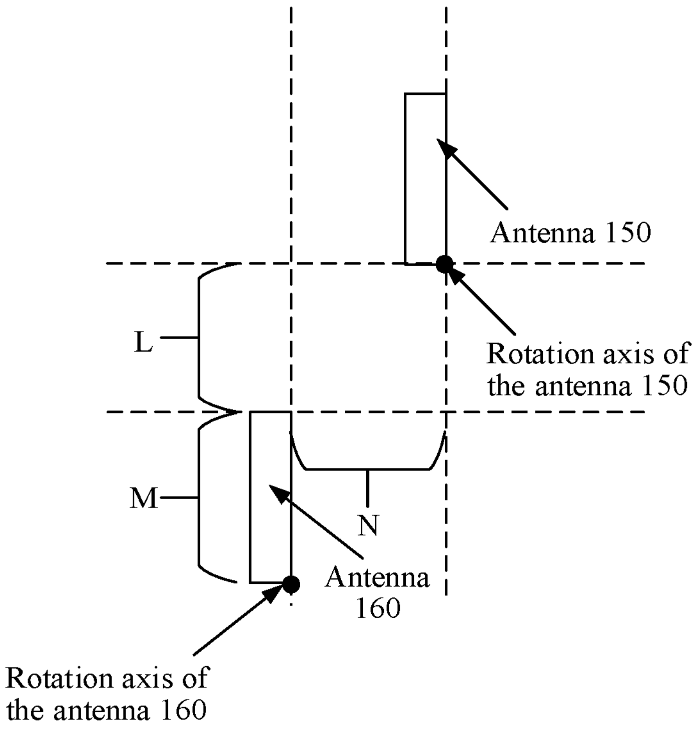
FIG. 13 is a schematic diagram of antenna arrangement according to this application.
Figure 14:
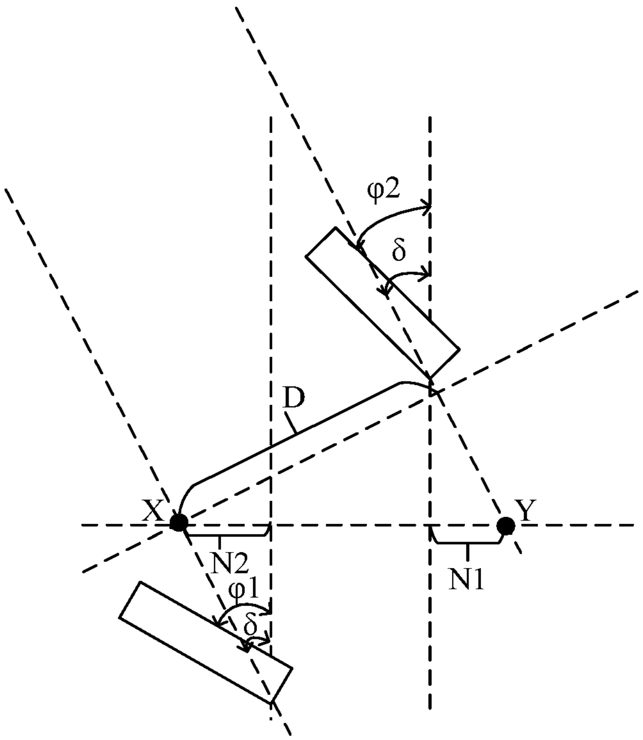
FIG. 14 is a schematic diagram of an antenna phase modulation manner according to this application in the arrangement shown in FIG. 13.

For example, when a downtilt is 0, if the antenna 150 and the antenna 160 are arranged in a manner shown in FIG. 13, to be specific, as shown in FIG. 13, if the antenna 150 is arranged above the antenna 160, a distance between the antenna 150 and the antenna 160 in a horizontal direction when the downtilt is 0 is N, a distance between the antenna 150 and the antenna 160 in a perpendicular direction is L, and a length of the antenna 160 is M, FIG. 14 shows the radio frequency wave path difference D between the signal #B and the signal #C when the mechanical downtilt of the antenna 150 is φ1 and the mechanical downtilt of the antenna 160 is φ2.

To be specific, the wave distance difference D satisfies the following formula:

$$D=AB\cdot\cos\delta=(N1+N2+N)\cos\delta$$

$$N1=L\cdot\tan\delta$$

$$N2=M\cdot\tan\delta$$

δ represents the target downtilts of the antenna 150 and the antenna 160 (or the signal #B and the signal #C).

Therefore, the phase difference P between the signal #C and the signal #B may be determined based on the wave path difference D, that is, P satisfies the following formula:

$$P=2\pi*D/\lambda,$$

λ represents a wavelength of the signal #C (or the signal #B).

It should be understood that, if the antenna 150 and the antenna 160 are coplanar when the downtilt is 0, N=0.

In addition, the distance L between the antenna 150 and the antenna 160 in the perpendicular direction when the downtilt is 0 may be 0 or may not be 0. A person skilled in the art may set or change the distance depending on an actual requirement.

As an example instead of a limitation, the modulator 195 may perform phase modulation based on at least one of the following information:

the wavelength λ of the signal #A (or the signal #B or the signal #C), the mechanical downtilt φ1, the mechanical downtilt φ2, the electrical downtilt θ1, and the electrical downtilt θ2.

For example, when the antenna 150 and the antenna 160 are arranged up and down in the gravity direction (that is, when the antenna 150 and the antenna 160 are arranged in the arrangement manner shown in FIG. 1 and FIG. 2), a distance between a lower antenna (for example, the antenna 160) and a target location is short. Therefore, a phase of the signal (the signal #C) sent by using the antenna 160 may be adjusted, so that the phase difference between the signal #C and the signal #B satisfies the following formula:

$$P=2\pi*(L*\sin(\varphi1+\theta1)+M*\sin(\varphi2+\theta2)/\lambda).$$

M represents the length of the antenna 160, and L represents the distance between the antenna 150 and the antenna 160 when the antenna 160 and the antenna 150 are vertically configured (that is, the mechanical downtilt is 0).

For another example, when the antenna 150 and the antenna 160 are arranged in the manner shown in FIG. 3, when the phase of the signal #C is adjusted, the distance N between the antenna 160 and the antenna 150 in the horizontal direction when the mechanical downtilt is 0 (in other words, when the antennas are vertically configured) may be further considered.

Figure 15:
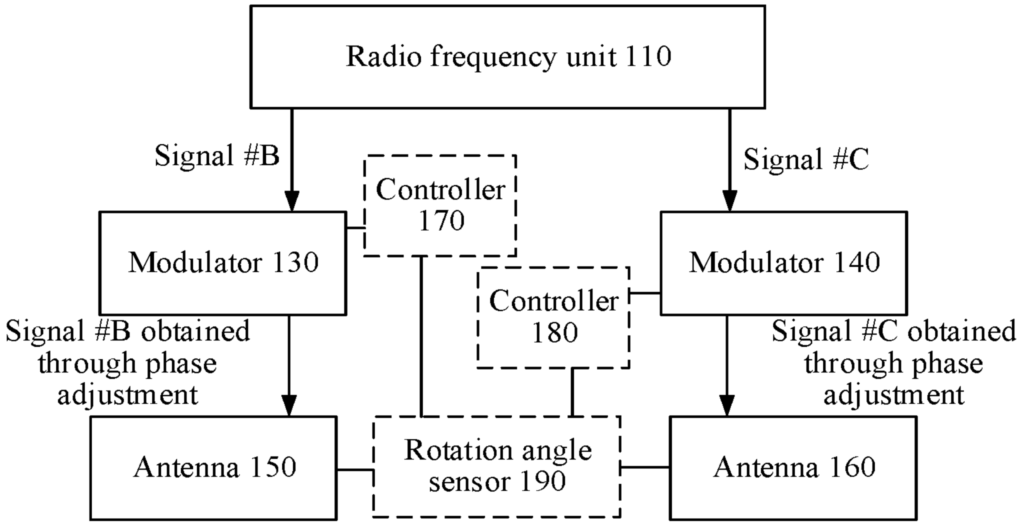
FIG. 15 is a schematic diagram of still another example of an antenna system according to this application.

FIG. 15 is a schematic diagram of another example of an antenna system according to this application. Different from the antenna system shown in FIG. 11, the radio frequency unit 110 may generate a plurality of signals, for example, the signal #B and the signal #C, so that the divider does not need to be disposed.

In a possible implementation, in the antenna system shown in FIG. 15, the radio frequency unit 110 generates the signal #B and the signal #C, so that there is the phase difference P between the signal #B and the signal #C.

Figure 16:
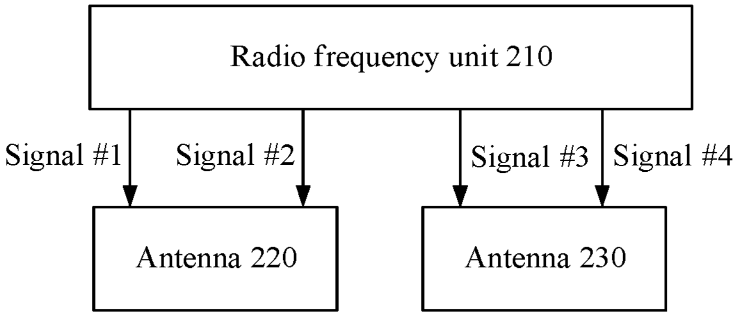
FIG. 16 is a schematic diagram of still another example of an antenna system according to this application.

FIG. 16 is a schematic diagram of another example of an antenna system according to this application. As shown in FIG. 16, the antenna system includes a radio frequency unit 210, an antenna 220 (an example of a first antenna), and an antenna 230 (an example of a second antenna).

The following separately describes functions and structures of the foregoing components in detail.

A. Antenna

The antenna system includes at least two antennas. Arrangement between any two of the at least two antennas is similar to the foregoing arrangement between the antenna #A and the antenna #B. For ease of understanding, a case in which the antenna system includes two antennas, namely, the antenna 220 and the antenna 230, is used for description herein.

Mechanical downtilts of the antenna 220 and the antenna 230 may be different.

For example, when the antenna 220 is a passive antenna, a mechanical downtilt of the antenna 220 may be determined depending on a signal coverage requirement of an active antenna disposed on the antenna 220.

For another example, when the antenna 230 is a passive antenna, a mechanical downtilt of the antenna 230 may be determined depending on a signal coverage requirement of an active antenna disposed on the antenna 230.

In addition, in this application, a signal transmitted by the antenna 220 and a signal transmitted by the antenna 230 carry same data, wavelengths of the signals are the same, and target downtilts of the antenna 220 and the antenna 230 are the same.

For ease of understanding and description, the target downtilts of the antenna 220 and the antenna 230 are denoted as δ below.

B. Radio Frequency Unit 210

The radio frequency unit 210 is configured to generate 2K radio frequency signals, where K is a quantity of antennas. The 2K radio frequency signals are divided into K signal groups. Each signal group includes two radio frequency signals, the K signal groups are in a one-to-one correspondence with K antennas, and a signal in each signal group is sent by using an antenna corresponding to the signal group.

For ease of understanding, the following uses a case in which K=2 as an example for description. In this case, the radio frequency unit 210 is configured to generate four radio frequency signals (which are denoted as a signal #1, a signal #2, a signal #3, and a signal #4). The signal #1 and the signal #2 form a signal group, and a signal in the signal group is sent by using the antenna 220. The signal #3 and the signal #4 form a signal group, and a signal in the signal group is sent by using the antenna 230.

In addition, there is a phase difference between the signal #1 and the signal #2, and the phase difference is for adjusting an electrical downtilt of the antenna 220. Assuming that the target downtilt of the antenna 220 is δ and the mechanical downtilt of the antenna 220 is φ1 (an example of a first mechanical downtilt φ1), the electrical downtilt θ1 that is of the antenna 220 and that is determined based on the phase difference between the signal #1 and the signal #2 satisfies the following formula:

$$\delta=\theta 1+\varphi 1$$

Similarly, there is a phase difference between the signal #3 and the signal #4, and the phase difference is for adjusting an electrical downtilt of the antenna 230. Assuming that the target downtilt of the antenna 220 is δ and the mechanical downtilt of the antenna 230 is φ2 (an example of a first mechanical downtilt φ2), the electrical downtilt θ2 that is of the antenna 230 and that is determined based on the phase difference between the signal #3 and the signal #4 satisfies the following formula:

$$\delta=\theta 1+\varphi 1$$

In this application, because arrangement locations of the antenna 220 and the antenna 230 are different, and the mechanical downtilts of the antenna 220 and the antenna 230 are different, signals respectively sent by the antenna 220 and the antenna 230 may not reach a same location simultaneously, affecting communication quality.

In this case, in this application, a phase difference between a signal with a lagging phase (which is assumed to be the signal #1) in the signal #1 and the signal #2 and a signal with a lagging phase (which is assumed to be the signal #3) in the signal #3 and the signal #4 may be further adjusted, so that the signals respectively sent by the antenna 220 and the antenna 230 can reach a same target simultaneously, or a time difference between arrival of the signals respectively sent by the antenna 220 and the antenna 230 at a same target falls within a preset range.

A method and a process of determining the phase difference between a signal with a lagging phase (which is assumed to be the signal #1) in the signal #1 and the signal #2 and a signal with a lagging phase (which is assumed to be the signal #3) in the signal #3 and the signal #4 may be similar to the foregoing method and process of determining the phase difference P. To avoid repetition, detailed descriptions thereof are omitted herein.

The antenna system provided in this application is also applicable to a signal receiving process. The signal receiving process is an inverse process of a signal sending process. To avoid repetition, detailed descriptions thereof are omitted herein.

Figure 17:
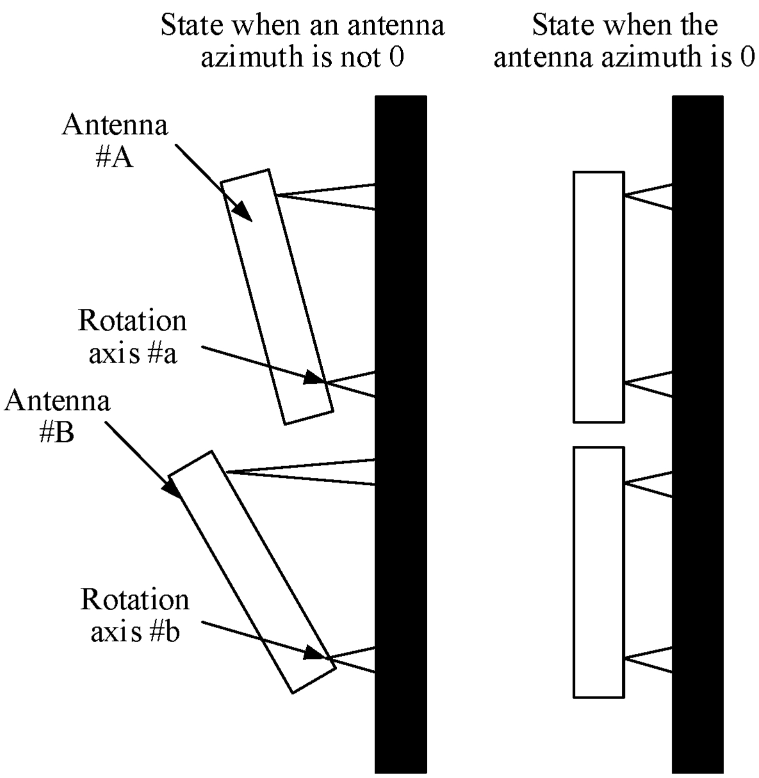
FIG. 17 is a schematic diagram of a top view of another example of an antenna arrangement manner according to this application.

The foregoing lists an adjustment process for the downtilt. This application is also applicable to an azimuth adjustment process. FIG. 17 is a schematic diagram of an example of antenna azimuth arrangement according to this application. To be specific, different from the downtilt arrangement shown in FIG. 2, in FIG. 17, a direction of a rotation axis is a vertical direction (or a gravity direction).

It should be understood that the antenna arrangement shown in FIG. 17 is merely an example for description, and this application is not limited thereto. A plurality of antennas with different azimuths may alternatively be non-coplanar when a mechanical azimuth is 0.

In addition, a process of determining and adjusting an electrical azimuth may be similar to the foregoing process of determining and adjusting the electrical downtilt. To avoid repetition, detailed descriptions thereof are omitted herein.

To be specific, when a same signal (or same data) is sent by using antennas with different mechanical azimuths, a method for adjusting electrical azimuths of the different antennas and a method for adjusting a phase difference between signals sent by the different antennas are similar to the processing processes shown in FIG. 11 to FIG. 16. To avoid repetition, detailed descriptions thereof are omitted herein.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or a part contributing to the prior art, or a part of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An antenna system, comprising:
- a first antenna,
- a second antenna,
- a radio frequency unit configured to generate a first radio frequency signal;
- a divider configured to divide the first radio frequency signal into a first radio frequency sub-signal and a second radio frequency sub-signal;
- a first modulator configured to adjust a first electrical downtilt of the first radio frequency sub-signal and output the adjusted first radio frequency sub-signal to the first antenna for transmission, wherein the first electrical downtilt is adjusted based on a target downtilt and a first mechanical downtilt of the first antenna; and
- a second modulator configured to adjust a second electrical downtilt of the second radio frequency sub-signal and output the adjusted second radio frequency sub-signal to the second antenna for transmission, wherein the second electrical downtilt is adjusted based on the target downtilt and a second mechanical downtilt of the second antenna, wherein the target downtilt is a same target downtilt of the first antenna and the second antenna.

2. The antenna system of claim 1, further comprising at least one of:
- a third antenna, disposed on the first antenna, wherein the third antenna is an active antenna and the first antenna is a passive antenna; or
- a fourth antenna, disposed on the second antenna, wherein the fourth antenna is an active antenna and the second antenna is a passive antenna.

3. The antenna system of claim 1, wherein the first modulator is configured to obtain the target downtilt corresponding to the first radio frequency signal and the first mechanical downtilt of the first antenna, and adjust the first electrical downtilt based on the target downtilt corresponding to the first radio frequency signal and the first mechanical downtilt of the first antenna; wherein the second modulator is configured to obtain the target downtilt corresponding to the first radio frequency signal and the second mechanical downtilt of the second antenna, and adjust the second electrical downtilt based on the target downtilt corresponding to the first radio frequency signal and the second mechanical downtilt of the second antenna.

4. The antenna system of claim 3, further comprising one or more rotation angle sensors configured to detect at least one of the first mechanical downtilt or the second mechanical downtilt and send indication information of the at least one of the first mechanical downtilt or the second mechanical downtilt to a corresponding modulator of the first modulator and the second modulator.

5. The antenna system of claim 1, the antenna system further comprising a first controller and a second controller, wherein
- the first controller is configured to control, based on the target downtilt corresponding to the first radio frequency signal and the first mechanical downtilt, the first modulator to adjust the first radio frequency sub-signal; and
- the second controller is configured to control, based on the target downtilt corresponding to the first radio frequency signal and the second mechanical downtilt, the second modulator to adjust the second radio frequency sub-signal.

6. The antenna system of claim 5, the antenna system further comprising at least one of a first rotation angle sensor or a second rotation angle sensor, wherein
- the first rotation angle sensor is communicatively connected to the first controller and configured to detect the first mechanical downtilt and send indication information of the first mechanical downtilt to the first controller; and
- the second rotation angle sensor is communicatively connected to the second controller and configured to detect the second mechanical downtilt and send indication information of the second mechanical downtilt to the second controller.

7. The antenna system of claim 1, the antenna system further comprising a third modulator coupled to the divider, the first modulator and the second modulator, wherein
- the third modulator is configured to receive the first radio frequency sub-signal and the second radio frequency sub-signal, and perform processing on a target radio frequency sub-signal, to adjust a phase difference P between the first radio frequency sub-signal and the second radio frequency sub-signal, wherein the target radio frequency sub-signal is at least one of the first radio frequency sub-signal and the second radio frequency sub-signal.

8. The antenna system of claim 7, wherein the phase difference P is determined based on first information including at least one of the following:
- the target downtilt, a wavelength $\lambda$ of the first radio frequency signal, the first mechanical downtilt $\varphi 1$, the second mechanical downtilt $\varphi 2$, the first electrical downtilt $\theta 1$, the second electrical downtilt $\theta 2$, a length M of a target antenna, a distance L between the first antenna and the second antenna in a gravity direction when both the first mechanical downtilt and the second mechanical downtilt are 0, or a distance N between the first antenna and the second antenna in a horizontal direction when both the first mechanical downtilt and the second mechanical downtilt are 0.

9. The antenna system of claim 7, wherein the first antenna and the second antenna are arranged along the gravity direction and the second antenna is a lower antenna in the gravity direction, the target radio frequency sub-signal is the second radio frequency sub-signal and sent by the second antenna.

10. The antenna system of claim 7, wherein the phase difference P is determined based on at least the following:

the first mechanical downtilt φ1, the second mechanical downtilt φ2, the first electrical downtilt θ1, and the second electrical downtilt θ2.

11. An antenna system, comprising a first antenna, a second antenna, a radio frequency unit, a first modulator, and a second modulator, wherein the first antenna is capable of rotating around a first rotation axis to adjust a first mechanical downtilt of the first antenna, and the second antenna is capable of rotating around a second rotation axis to adjust a second mechanical downtilt of the second antenna, wherein the radio frequency unit is configured to generate a first radio frequency signal and a second radio frequency signal, wherein the first radio frequency signal and the second radio frequency signal have a same wavelength, a same target downtilt and carry same data;

the first modulator is configured to adjust a first electrical downtilt of the first radio frequency signal and output the adjusted first radio frequency signal to the first antenna for transmission, wherein the first electrical downtilt is adjusted based on the same target downtilt and the first mechanical downtilt;

the second modulator is configured to adjust a second electrical downtilt of the second radio frequency signal and output the adjusted second radio frequency signal to the second antenna for transmission, wherein the second electrical downtilt is adjusted based on the target downtilt and the second mechanical downtilt.

12. The antenna system of claim 11, further comprising at least one of:

a third antenna, disposed on the first antenna, wherein the third antenna is an active antenna and the first antenna is a passive antenna; or a fourth antenna, disposed on the second antenna, wherein the fourth antenna is an active antenna and the second antenna is a passive antenna.

13. The antenna system of claim 11, the antenna system further comprising at least one of a first controller or a second controller, wherein the first controller is configured to control, based on the target downtilt corresponding to the first radio frequency signal and the first mechanical downtilt, the first modulator to adjust the first electrical downtilt; and the second controller is configured to control, based on the target downtilt corresponding to the first radio frequency signal and the second mechanical downtilt, the second modulator to adjust the second electrical downtilt.

14. The antenna system of claim 13, the antenna system further comprising at least one of a first rotation angle sensor or a second rotation angle sensor, wherein the first rotation angle sensor is communicatively connected to the first controller and configured to detect the first mechanical downtilt and send indication information of the first mechanical downtilt to the first controller; and the second rotation angle sensor is communicatively connected to the second controller and configured to detect the second mechanical downtilt and send indication information of the second mechanical downtilt to the second controller.

15. The antenna system of claim 11, wherein the first antenna and the second antenna are arranged along a gravity direction and the second antenna is a lower antenna disposed lower than the first antenna in the gravity direction, the second modulator is further configured to adjust a phase of the second radio frequency signal to adjust a phase difference P.

16. The antenna system of claim 15, wherein the phase difference P is determined based on first information including at least one of the following:

the target downtilt, a wavelength λ of the first radio frequency signal, the first mechanical downtilt φ1, the second mechanical downtilt φ2, the first electrical downtilt θ1, the second electrical downtilt θ2, a length M of a target antenna, a distance L between the first antenna and the second antenna in a gravity direction when both the first mechanical downtilt and the second mechanical downtilt are 0, or a distance N between the first antenna and the second antenna in a horizontal direction when both the first mechanical downtilt and the second mechanical downtilt are 0.

17. An antenna system, comprising a first antenna, a second antenna, and a radio frequency unit, wherein the first antenna is capable of rotating around a first rotation axis to adjust a first mechanical downtilt of the first antenna, and the second antenna is capable of rotating around a second rotation axis to adjust a second mechanical downtilt of the second antenna, wherein the radio frequency unit is configured to generate a first radio frequency signal, a second radio frequency signal, a third radio frequency signal, and a fourth radio frequency signal, wherein the first radio frequency signal, the second radio frequency signal, the third radio frequency signal, and the fourth radio frequency signal have a same wavelength and a same target downtilt and carry same data, wherein the second radio frequency signal has a first phase difference with the first radio frequency signal, the fourth radio frequency signal has a second phase difference with the third radio frequency signal, the first phase difference is determined based on the target downtilt and the first mechanical downtilt, and the second phase difference is determined based on the target downtilt and the second mechanical downtilt;

the first antenna is configured to transmit the first radio frequency signal and the second radio frequency signal; and the second antenna is configured to transmit the third radio frequency signal and the fourth radio frequency signal.

18. The antenna system of claim 17, the antenna system further comprising at least one of a first rotation angle sensor or a second rotation angle sensor, wherein the first rotation angle sensor is communicatively connected to the radio frequency unit and configured to detect the first mechanical downtilt and send indication information of the first mechanical downtilt to the radio frequency unit; and the second rotation angle sensor is communicatively connected to the radio frequency unit and configured to detect the second mechanical downtilt and send indication information of the second mechanical downtilt to the radio frequency unit.

19. The antenna system of claim 18, wherein the radio frequency unit is further configured to adjust a third phase difference P between a fifth radio frequency signal and a sixth radio frequency signal, the fifth radio frequency signal being a signal with a lagging phase in the first radio frequency signal and the second radio frequency signal and the sixth radio frequency signal being a signal with a lagging phase in the third radio frequency signal and the fourth radio frequency signal.

20. The antenna system of claim 19, wherein the third phase difference P is determined based on first information including at least one of the following:

the target downtilt, a wavelength λ of the first radio frequency signal, the first mechanical downtilt φ1, the second mechanical downtilt φ2, a first electrical downtilt θ1, a second electrical downtilt θ2, a length M of a target antenna, a distance L between the first antenna and the second antenna in a gravity direction when both the first mechanical downtilt and the second mechanical downtilt are 0, or a distance N between the first antenna and the second antenna in a horizontal direction when both the first mechanical downtilt and the second mechanical downtilt are 0.

* * * * *